(12) United States Patent
Srinivasa

(10) Patent No.: US 7,409,092 B2
(45) Date of Patent: Aug. 5, 2008

(54) METHOD AND APPARATUS FOR THE SURVEILLANCE OF OBJECTS IN IMAGES

(75) Inventor: Narayan Srinivasa, Thousand Oaks, CA (US)

(73) Assignee: HRL Laboratories, LLC, Malibu, CA (US)

( * ) Notice: Subject to any disclaimer, the term of this patent is extended or adjusted under 35 U.S.C. 154(b) by 1113 days.

(21) Appl. No.: 10/329,319

(22) Filed: Dec. 23, 2002

(65) Prior Publication Data
US 2003/0235327 A1 Dec. 25, 2003

Related U.S. Application Data

(60) Provisional application No. 60/391,294, filed on Jun. 20, 2002.

(51) Int. Cl.
*G06K 9/00* (2006.01)
*G06K 9/48* (2006.01)
*G06K 9/40* (2006.01)

(52) U.S. Cl. .................. 382/199; 382/103; 382/104; 382/261; 382/265; 382/266

(58) Field of Classification Search ............ 382/103, 382/104, 199, 260–270, 284
See application file for complete search history.

(56) References Cited

U.S. PATENT DOCUMENTS 6,418,242 B1* 7/2002 Maurer ................ 382/266

OTHER PUBLICATIONS

Xingyuan et al., "A Robust Method for Unknown Forms Analysis," IEEE, Sep. 20-22, 1999, pp. 531-534.*

Zielke, T., Brauckmann, M., and von Seelen, W., "Intensity and edge-based symmetry detection with an application to car-following," CVGIP: Image Understanding, vol. 58, pp. 177-190, 1993.

Thomanek, F., Dickmanns, E. D., and Dickmanns, D., "Multiple object recognition and scene interpretation for autonomous road vehicle guidance," Intelligent Vehicles, pp. 231-236, 1994.

Rojas, J. C., and Crisman, J. D., "Vehicle detection in color images," in Proc. of IEEE Intelligent Transportationm Systems, Boston, MA, 1995.

Kaminiski, L., Allen, J., Masaki, I., and Lemus, G., "A sub-pixel stereo vision system for cost-effective intelligent vehicle applications," Intelligent Vehicles, pp. 7-12, 1995.

(Continued)

*Primary Examiner*—Matthew C. Bella
*Assistant Examiner*—Wesley Tucker
(74) *Attorney, Agent, or Firm*—Tope-McKay & Associates

(57) ABSTRACT

Object detection and tracking operations on images that may be performed independently are presented. A detection module receives images, extracts edges in horizontal and vertical directions, and generates an edge map where object-regions are ranked by their immediacy. Filters remove attached edges and ensure regions have proper proportions/size. The regions are tested using a geometric constraint to ensure proper shape, and are fit with best-fit rectangles, which are merged or deleted depending on their relationships. Remaining rectangles are objects. A tracking module receives images in which objects are detected and uses Euclidean distance/edge density criterion to match objects. If objects are matched, clustering determines whether the object is new; if not, a sum-of-squared-difference in intensity test locates matching objects. If this succeeds, clustering is performed and rectangles are applied to regions and merged or deleted depending on their relationships and are considered objects; if not the regions are rejected.

120 Claims, 17 Drawing Sheets

OTHER PUBLICATIONS

Willersinn, D., and Enkelmann, W., "Robust Obstacle Detection and Tracking by Motion Analysis," in Proc. of IEEE International Conference on Intelligent Vehicles, 1998.

Smith, S. M., and Brady, J. M., "ASSET-2: Real Time Motion Segmentation and Shape Tracking," IEEE Transactions on Pattern Analysis and Machine Intelligence, vol. 17, No. 8, Aug. 1995.

Daugmann, J., "Complete discrete 2D Gabor Transforms by Neural Networks for Image Analysis and Compression," IEEE Trans. On Acoustics, Speech and Signal Processing, vol. 36, pp. 1169-1179, 1988.

Freeman, W. T., and Adelson, E. H., "The Design and Use of Steerable Filters," IEEE Trans. On Pattern Analysis and Machine Intelligence, vol. 13, No. 9. Sep. 1991.

Yao, Y., and Chellapa, R., "Tracking a Dynamic Set of Feature Points," IEEE Transactions on Image Processing, vol. 4, No. 10, pp. 1382-1395, Oct. 1995.

Barron, J. L., Fleet, D. J., and Beauchemin, S. S., "Performance of Optic Flow Techniques,"International Journal of Computer Vision, vol. 12, No. 1, pp. 43-77, 1994.

Kolodzy, P. "Multidimensional machine vision using neural networks," Proc. of IEEE International Conference on Neural Networks, pp. 747-758, 1987.

Grossberg, S., and Mingolla, E., "Neural Dynamics of surface perception: boundary webs, illuminants and shape from shading," Computer Vision, Graphics and Image Processing, vol. 37, pp. 116-165, 1987.

Hashimoto, M., and Sklansky, J., "Multiple-Order Derivatives for Detecting Local Image Characteristics," Computer Vision, Graphics and Image Processing, vol. 39, pp. 28-55, 1987.

Betke, M., and Nguyen, H., "Highway scene analysis from a moving vehicle under reduced visibility conditions," in Proc. of IEEE International Conference on Intelligent Vehicles, pp. 131-13, 1998.

Smith, S. M., and Brady, J. M., "A Scene Segmenter: Visual Tracking of Moving Vehicles," Engineering Application sof Artificial Intelligence, vol. 7, No. 2, pp. 191-204, 1994.

Kalinke, T., Tzomakas, C., and Seelen, v. W., "A Texture-based object detection and an adaptive model-based classification," Proc. of IEEE International Conference on Intelligent Vehicles, 1998.

Gavrila, D. M., and Philomin, P., "Real-Time Object Detection Using Distance Transform," in Proc. of IEEE International Conference on Intelligent Vehicles, pp. 274-279, 1998.

Jain, R., Kasturi, R., and Schunck, B. G., Machine Vision, pp. 140-180, co-published by MIT Press and McGraw-Hill Inc, 1995.

Ballard, D. H., "Generalizing Hough Transform to Detect Arbitrary Shapes," Pattern Recognition, vol. 13, No. 2, pp. 111-122, 1981.

Lucas, B., and Kanade, T., "An iterative image registration technique with an application to stereo vision," DARPA Image Understanding Workshop, pp. 121-130, 1981.

Wang, Y. A., and Adelson, E. H., "Saptio-Temporal Segmentation of Video Data," M.I.T. Media Laboratory Vision and Modeling Group, Technical Report, No. 262, Feb. 1994.

* cited by examiner

METHOD AND APPARATUS FOR THE SURVEILLANCE OF OBJECTS IN IMAGES

RELATED APPLICATIONS

This application is related to U.S. Patent Application 60/391,294, titled "METHOD AND APPARATUS FOR THE SURVEILLANCE OF OBJECTS IN IMAGES", filed with the U.S. Patent and Trademark Office on Jun. 20, 2002, which is incorporated by reference herein in its entirety.

BACKGROUND (1) Technical Field

The present invention relates to techniques for the surveillance of objects in images, and more specifically to systems that automatically detect and track vehicles for use in automotive safety.

(2) Discussion

Current computer vision techniques for vehicle detection and tracking require explicit parameter assumptions (such as lane locations, road curvature, lane widths, road color, etc.) and/or use computationally expensive approaches such as optical flow and feature-based clustering to identify and track vehicles. Systems that use explicit parameter assumptions suffer from excessive rigidity, as changes in scenery can severely degrade system performance. On the other hand, computationally expensive approaches are typically difficult to implement and expensive to deploy.

To overcome these limitations, a need exists in the art for a system that does not make any explicit assumptions regarding lane and/or road models and that does not need expensive computation.

The following references are provided as additional general information regarding the field of the invention.

1. Zielke, T., Brauckmann, M., and von Seelen, W., "Intensity and edge-based symmetry detection with an application to car-following," CVGIP: Image Understanding, vol. 58, pp. 177-190, 1993.

2. Thomanek, F., Dickmanns, E. D., and Dickmanns, D., "Multiple object recognition and scene interpretation for autonomous road vehicle guidance," Intelligent Vehicles, pp. 231-236, 1994.

3. Rojas, J. C., and Crisman, J. D., "Vehicle detection in color images," in Proc. of IEEE Intelligent Transportationm Systems, Boston, Mass., 1995.

4. Betke, M., and Nguyen, H., "Highway scene analysis from a moving vehicle under reduced visibility conditions," in Proc. of IEEE International Conference on Intelligent Vehicles, pp. 131-13, 1998.

5. Kaminiski, L., Allen, J., Masaki, I., and Lemus, G., "A sub-pixel stereo vision system for cost-effective intelligent vehicle applications," Intelligent Vehicles, pp. 7-12, 1995.

6. Luong, Q., Weber, J., Koller, D., and Malik, J., "An integrated stereo-based approach to automatic vehicle guidance," in International Conference on Computer Vision, pp. 52-57, 1995.

7. Willersinn, D., and Enkelmann, W., "Robust Obstacle Detection and Tracking by Motion Analysis," in Proc. of IEEE International Conference on Intelligent Vehicles, 1998.

8. Smith, S. M., and Brady, J. M., "A Scene Segmenter: Visual Tracking of Moving Vehicles," Engineering Applications of Artificial Intelligence, vol. 7, no. 2, pp. 191-204, 1994.

9. Smith, S. M., and Brady, J. M., "ASSET-2: Real Time Motion Segmentation and Shape Tracking," IEEE Transactions on Pattern Analysis and Machine Intelligence, vol. 17, no. 8, August 1995.

10. Kalinke, T., Tzomakas, C., and Seelen, v. W., "A Texture-based object detection and an adaptive model-based classification," Proc. of IEEE International Conference on Intelligent Vehicles, 1998.

11. Gavrila, D. M., and Philomin, P., "Real-Time Object Detection Using Distance Transform," in Proc. of IEEE International Conference on Intelligent Vehicles, pp. 274-279, 1998.

12. Barron, J. L., Fleet, D. J., and Beauchemin, S. S., "Performance of Optic Flow Techniques," International Journal of Computer Vision, vol. 12, no. 1, pp. 43-77, 1994.

14. Jain, R., Kasturi, R., and Schunck, B. G., Machine Vision, pp. 140-180, co-published by MIT Press and McGraw-Hill Inc, 1995.

15. Kolodzy, P. "Multidimensional machine vision using neural networks," Proc. of IEEE International Conference on Neural Networks, pp. 747-758, 1987.

16. Grossberg, S., and Mingolla, E., "Neural Dynamics of surface perception:

boundary webs, illuminants and shape from shading," Computer Vision, Graphics and Image Processing, vol. 37, pp. 116-165, 1987.

17. Ballard, D. H., "Generalizing Hough Transform to Detect Arbitrary Shapes," Pattern Recognition, vol. 13, no. 2, pp. 111-122, 1981.

18. Daugmann, J., "Complete discrete 2D Gabor Transforms by Neural Networks for Image Analysis and Compression," IEEE Trans. On Acoustics, Speech and Signal Processing, vol. 36, pp. 1169-1179, 1988.

19. Hashimoto, M., and Sklansky, J., "Multiple-Order Derivatives for Detecting Local Image Characteristics," Computer Vision, Graphics and Image Processing, vol. 39, pp. 28-55, 1987.

20. Freeman, W. T., and Adelson, E. H., "The Design and Use of Steerable Filters," IEEE Trans. On Pattern Analysis and Machine Intelligence, vol. 13, no. 9. September 1991.

21. Yao, Y., and Chellapa, R., "Tracking a Dynamic Set of Feature Points," IEEE Transactions on Image Processing, vol. 4, no. 10, pp. 1382-1395, October 1995.

22. Lucas, B., and Kanade, T., "An iterative image registration technique with an application to stereo vision," DARPA Image Understanding Workshop, pp. 121-130, 1981.

23. Wang, Y. A., and Adelson, E. H., "Saptio-Temporal Segmentation of Video Data," M.I.T. Media Laboratory Vision and Modeling Group, Technical Report, no. 262, Febraury, 1994.

SUMMARY OF THE INVENTION

The present invention relates to techniques for the surveillance of objects in images, and more specifically to systems that automatically detect and track vehicles for use in automotive safety. The invention includes detection and tracking modules that may be used independently or together depending on a particular application. In addition, the invention also includes filtering mechanisms for assisting in object detection.

In a one aspect, the present invention provides a method for ranking edge regions representing objects in an image based on their immediacy with respect to a reference. In this aspect, an image is received, including edge regions. A ranking reference is determined within the image; and the edge regions are ranked with respect to it. Next, an edge region reference is determined for each edge region, and the offset from the edge region references are determined with respect to the ranking reference. The results are then normalized and ranked such that the ranked normalized offsets provide a ranking of the immediacy of objects represented by the edge regions. The edge region reference may be a centroid of the area of the edge region to which it corresponds.

In another aspect, the image comprises a plurality of pixels, and the edge regions each comprise areas represented by a number of pixels. Each offset is represented by a distance measured as a number of pixels, and each normalized offset is determined by dividing the number of pixels representing the offset for an edge region by the number of pixels representing the area of the edge region.

In another aspect, the objects represented by edge regions are automobiles and the ranking reference is the hood of an automobile from which the image was taken, and in a still further aspect, the offset includes only a vertical component measured as a normal line from a point on the hood of the automobile to the centroid of the area of the edge region. In another aspect, the immediacy is indicative of a risk of collision between the automobile from which the image was taken and the object represented by the edge region.

In another aspect, the present invention further comprises a step of selecting a fixed-size set of edge regions based on their ranking and discarding all other edge regions, whereby only the edge regions representing objects having the greatest immediacy are kept. In yet another aspect, the present invention comprises a further step of providing the rankings of the edge regions representing objects kept to an automotive safety system.

In another aspect, the present invention provides a method for detecting objects in an image including a step of applying a compactness filter to the image. The compactness filter comprises a first step of receiving an image including edge regions representing potential objects. Next, a geometric shape is determined for application as a compactness filter, with the geometric shape including a reference point. Then, an edge region reference is determined on each edge region in the image, and the reference point on each edge region is aligned with the reference point of the geometric shape. Next, search lines are extended from the edge region reference in at least one direction. Then, intersections of the search lines with the geometric shape are determined, and if a predetermined number of intersections exists, classifying the edge region as a compact object.

In another aspect, the objects are cars, and the geometric shape is substantially "U"-shaped.

In a still further aspect, the search lines are extended in eight directions with one search line residing on a horizontal axis, with a 45 degree angle between each search line and each other search line. Also, at least four intersections between search lines and the geometric shape, including an intersection in a bottom vertical direction, must occur for the edge region to be classified as a compact object. Then all edge regions not classified as compact objects may be eliminated from the image. After the compact objects have been classified, information regarding them may be provided to an automotive safety system.

In another aspect, the present invention provides a method for the surveillance of objects in an image, with the method comprising a step of detecting objects. First, an image is received including edge regions. Next horizontal edges and vertical edges are independently extracted from the image. Then, horizontal edges and vertical edges that exceed at least one length-based threshold are eliminated. Next, the remaining horizontal edges and vertical edges are combined into edge regions to generate an integrated edge map. Then, a ranking filter is applied to rank relative immediacies of objects represented by the edge regions in the integrated edge map.

In another aspect, the edge extraction operations are performed by use of a Sobel operator. In another aspect, the horizontal and vertical edges are grouped into connected edge regions based on proximity. A fixed-size set of objects may be selected based on their ranking and other objects may be discarded to generate a modified image. A compactness filter, as previously described, may be applied to the modified image to detect edge regions representing objects likely to be of interest.

In another aspect, an attached line edge filter is applied to the modified image to remove remaining oriented lines from edge regions in the modified image. Next, an aspect ratio and size filter is applied to remove edge regions from the image that do not fit a pre-determined aspect ratio or size criterion. Then, each of the remaining edge regions is fitted within a minimum enclosing rectangle. Subsequently, rectangles that are fully enclosed in a larger rectangle are removed along with rectangles that are vertically stacked above another rectangle. Rectangles that overlap in excess of a pre-determined threshold are merged. Each remaining rectangle is labeled as an object of interest.

In another aspect, the attached line edge filter uses a Hough Transform to eliminate oriented edge segments that match patterns for expected undesired edge segments.

In another aspect, the aspect ratio has a threshold of 3.5 and the size criterion has a threshold of about 1/30 of the pixels in the image, and where edge regions that do not match both of these criterions are excluded from the image.

Between the application of the aspect ratio and size filter and the fitting of each of the remaining edge regions within a minimum enclosing rectangle, a compactness filter, as described above may be applied to remove those edge regions from the image that do not match the predetermined geometrical constraint.

Note that the compactness filter and the ranking filter may be used together or independently in the object detection process.

In another aspect, the present invention provides a method for the surveillance of objects in an image comprising a step of tracking objects from a first frame to a next frame in a series of images. Each image includes at least one region. In this method, first objects within the first frame are detected. Note that although labeled as the "first" frame, this label is intended to convey simply that the first frame was received before the second frame, and not that the first frame is necessarily the first frame in any absolute sense with respect to a sequence of frames. After the objects are detected in the first frame, they are also detected in the next frame. "Next" as used here is simply intended to convey that this frame was received after the first frame, and is not intended to imply that it must be the immediately next one in a sequence of images. After the objects have been detected in the first and next frames, the objects of the first frame and the next frame are matched using at least one geometric criterion selected from a group consisting of a Euclidean distance criterion and an edge density criterion, in order to find clusters of objects.

In another aspect, in the process of matching regions of the first frame and the next frame, the Euclidean distance criterion is used to determine a centroid of the area of an object in the first frame and a centroid of the area of the same object in the next frame. When the position of the centroid in the first frame is within a predetermined distance of the centroid in the next frame, the object in the first frame is considered matched with the object in the next frame. For objects with centroids that are matched, the edge density criterion is applied to determine a density of edges in regions of the objects and a size of the objects. If a size difference between the matched objects is below a predetermined threshold, then the object with the greater density of edges is considered to be the object and an operation of determining object clusters is performed to determine if the object is a new object or part of an existing cluster of objects. When the position of the centroid in the first frame is not within a predetermined distance of the centroid in the next frame, or when the size difference between the matched objects is above a predetermined threshold, a sum-of-square-of-difference in intensity criterion is applied to determine whether to consider the object in the first image or the object in the next image as the object. If the sum-of-square-of-difference in intensity criterion fails, the object is eliminated from the image. If the sum-of square-of-difference in intensity criterion passes, an operation of determining object clusters is performed to determine if the object is a new object or part of an existing cluster of objects, whereby objects may be excluded, may be considered as new objects, or may be considered as an object in an existing cluster of objects.

In another aspect, the operation of determining object clusters begins by clustering objects in the first frame into at least one cluster. Next, a centroid of the area of the at least one cluster is determined. Then, a standard deviation in distance of each object in the second image from a point in the next frame is determined, corresponding to the centroid of the area of the at least one cluster. When the distance between an individual object and the point corresponding to the centroid exceeds a threshold, the individual object is considered a new object. When the distance between an individual object and the point corresponding to the centroid is less than the threshold, the individual object is considered part of the cluster.

In a further aspect, the image includes a plurality of pixels, with each pixel including a Cartesian vertical "Y" component. The predetermined geometric constraint is whether a pixel representing a centroid of the individual object has a greater "Y" component than the centroid of the cluster. When the individual object has a greater "Y" component, the individual object is excluded from further consideration.

In a still further aspect, the method for the surveillance of objects in an image further comprises operations of merging best-fit rectangles for regions that are fully enclosed, are vertically stacked, or are overlapping; and labeling each remaining region as a region of interest.

In another aspect, the present invention includes operation of a sum-of-square-of-difference in intensity of pixels over an area of the next frame associated with an area of an object in the first frame over all positions allowed by a search area constraint. Next, the position which yields the least sum-of-square-of-difference in intensity of pixels is determined. If the least sum-of-square-of-difference in intensity is beneath a predetermined threshold, the area of the next frame is shifted into alignment based on the determined position, whereby errors in positions of objects are minimized by aligning them properly in the next frame.

Each of the operations of the method discussed above typically corresponds to a software module or means for performing the function on a computer or a piece of dedicated hardware with instructions "hard-coded" therein in circuitry. In other aspects, the present invention provides an apparatus comprising a computer system including a processor, a memory coupled with the processor, an input coupled with the processor for receiving images from at least one image source, and an output coupled with the processor for outputting an output selected from a group consisting of a recommendation, a decision, and a classification based on the information collected. The computer system may be a stand-alone system or it may be a distributed computer system. The computer system further comprises means, residing in its processor and memory for performing the steps mentioned above in the discussion of the method. In another aspect, the apparatus may also include the image sources from which images are gathered (e.g., video cameras, radar imaging systems, etc.).

In other aspects, the means or modules (steps) may be incorporated onto a computer readable medium to provide a computer program product.

BRIEF DESCRIPTION OF THE DRAWINGS

The objects, features and advantages of the present invention will be apparent from the following detailed descriptions of the various aspects of the invention in conjunction with reference to the following drawings.

FIG. 5(a) presents the image prior to operation, and FIG. 5(b) presents the image after operation;

FIG. 7(a) depicts vectors from the reference to the centroid of each edge region and FIG. 7(b) depicts the image after operation of the ranking filter;

FIG. 9(a) shows the image prior to filtering and FIG. 9(b) shows the image after filtering;

FIG. 11(a) shows the image prior to filtering and FIG. 11(b) shows the image after filtering;

FIG. 12(a) is an illustrative diagram showing two regions, with one region completely contained within another region;

FIG. 12(b) is an illustrative diagram showing two regions, with one region vertically stacked over another region;

FIG. 12(c) is an illustrative diagram showing two regions, with one region partially overlapping with another region;

FIG. 16(a) shows the clustering operation and FIG. 16(b) shows the result of applying a boundary to the area in which objects are considered.

DETAILED DESCRIPTION

Figure 1:
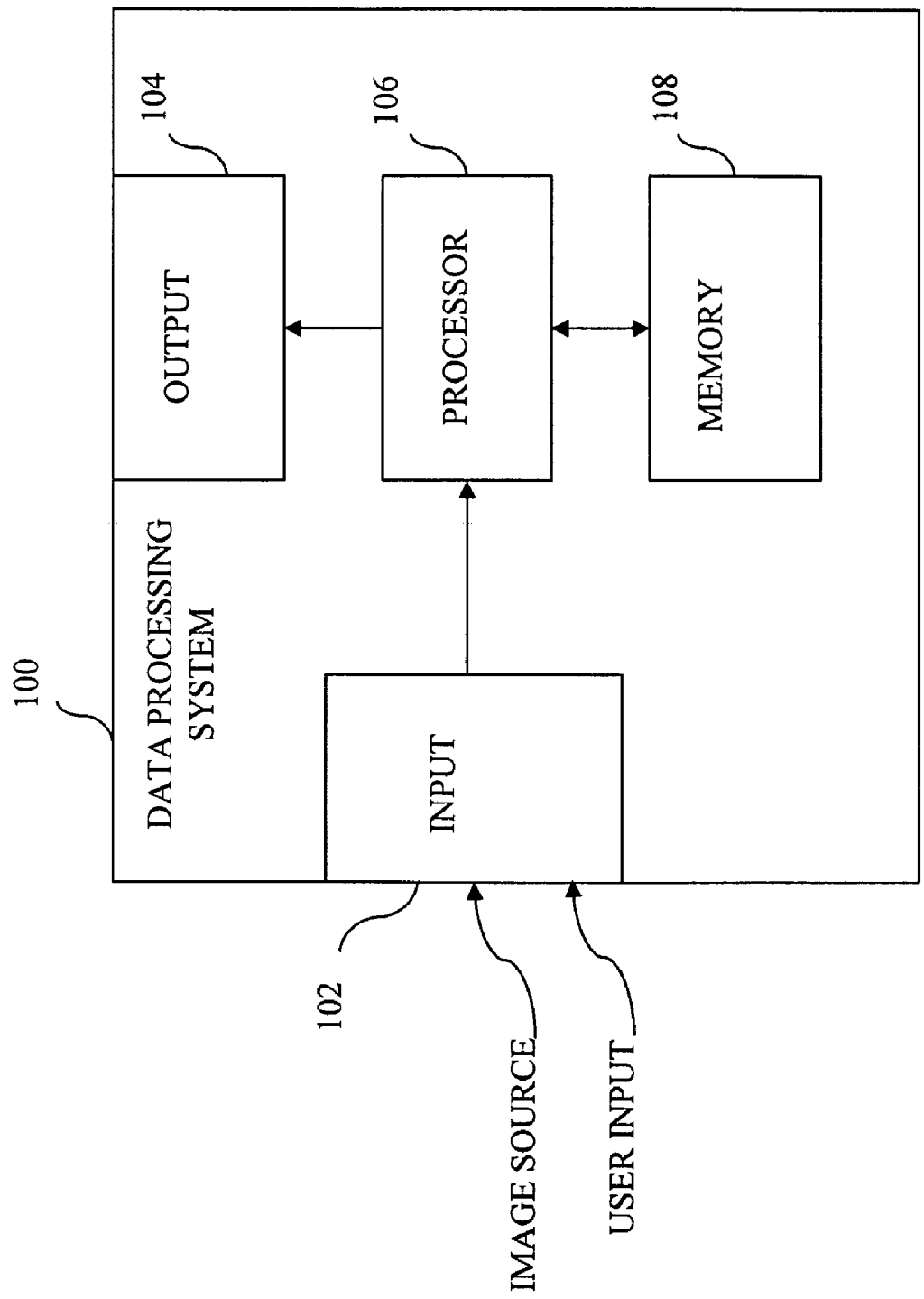
FIG. 1 is a block diagram depicting the components of a computer system used in the present invention.

The present invention relates to techniques for the surveillance of objects in images, and more specifically to systems that automatically detect and track vehicles for use in automotive safety. The following description, taken in conjunction with the referenced drawings, is presented to enable one of ordinary skill in the art to make and use the invention and to incorporate it in the context of particular applications. Various modifications, as well as a variety of uses in different applications, will be readily apparent to those skilled in the art, and the general principles defined herein, may be applied to a wide range of aspects. Thus, the present invention is not intended to be limited to the aspects presented, but is to be accorded the widest scope consistent with the principles and novel features disclosed herein. Furthermore, it should be noted that, unless explicitly stated otherwise, the figures included herein are illustrated diagrammatically and without any specific scale, as they are provided as qualitative illustrations of the concept of the present invention.

In order to provide a working frame of reference, first a glossary of terms used in the description and claims is given as a central resource for the reader. Next, a discussion of various physical aspects of the present invention is provided. Finally, a discussion is provided to give an understanding of the specific details.

(1) Glossary

Before describing the specific details of the present invention, a centralized location is provided in which various terms used herein and in the claims are defined. The glossary provided is intended to provide the reader with a general understanding of the intended meaning of the terms, but is not intended to convey the entire scope of each term. Rather, the glossary is intended to supplement the rest of the specification in more accurately explaining the terms used.

Immediacy—This term refers to the (possibly weighted) location of objects detected/tracked with respect to a reference point. For example, in a vehicle detecting and tracking system, where the bottom of the image represents the hood of a car, immediacy is measured by determining the location of other vehicles in the image with respect to the bottom of the image. The location may be normalized/weighted, for example, by dividing the distance of a detected vehicle from the hood of the car (vertically measured in pixels) by the area of an edge-based representation of the vehicle. The resulting number could be considered the immediacy of the vehicle with respect to the hood of the car. This measure of immediacy may then be provided to warning systems and used as a measure of the level of threat. The specification of what constitutes "immediacy" depends on the goal of a particular application, and could depend on a variety of factors, non-limiting examples of which could include object size, object location within the image, object shape, and overall density of objects in the image, or a combination of many factors.

Means—The term "means" as used with respect to this invention generally indicates a set of operations to be performed on, or in relation to, a computer. Non-limiting examples of "means" include computer program code (source or object code) and "hard-coded" electronics. The "means" may be stored in the memory of a computer or on a computer readable medium, whether in the computer or in a location remote from the computer.

Object—This term refers to any item or items in an image for which detection is desired. For example, in a case where the system is deployed for home security, objects would generally be human beings. On the other hand, when automobile detection and tracking is desired, cars, buses, motorcycles, and trucks are examples of objects to be tracked. Although other items generally exist in an image, such as lane markers, signs, buildings, and trees in an automobile detection and tracking case, they are not considered to be objects, but rather extraneous features in the image. Also, because this Description is presented in the context of a vehicle detecting and tracking system, the term "object" and "vehicle" are often used interchangeably.

Surveillance—As used herein, this term is intended to indicate an act of observing objects, which can include detecting operations or tracking operations, or both. The results of the surveillance can be utilized by other systems in order to take action. For example, if specified criterion are met in a situation involving home security, a command may be sent to an alarm system to trigger an alarm or, perhaps, to call for the aid of law enforcement.

(2) Physical Aspects

The present invention has three principal "physical" aspects. The first is a system surveillance of objects in images, and is typically in the form of a computer system operating software or in the form of a "hard-coded" instruction set. The computer system may be augmented by other systems or by imaging equipment. The second physical aspect is a method, typically in the form of software, operated using a data processing system (computer). The third principal physical aspect is a computer program product. The computer program product generally represents computer readable code stored on a computer readable medium such as an optical storage device, e.g., a compact disc (CD) or digital versatile disc (DVD), or a magnetic storage device such as a floppy disk or magnetic tape. Other, non-limiting examples of computer readable media include hard disks, read only memory (ROM), and flash-type memories.

A block diagram depicting the components of a general or specific purpose computer system used in an aspect the present invention is provided in FIG. 1. The data processing system 100 comprises an input 102 for receiving a set of images to be used for object detecting and tracking. The input 102 can also be used for receiving user input for a variety of reasons such as for setting system parameters or for receiving additional software modules. Generally, the input receives images from an imaging device, non-limiting examples of which include video cameras, infrared imaging cameras, and radar imaging cameras. The input 102 is connected with the processor 106 for providing information thereto. A memory 108 is connected with the processor 106 for storing data and software to be manipulated by the processor 106. An output 104 is connected with the processor for outputting information so that it may be used by other modules or systems. Note also, however, that the present invention may be applied in a distributed computing environment, where tasks are performed using a plurality of processors (i.e., in a system where a portion of the processing, such as the detection operation, is performed at the camera, and where another portion of the processing, such as the tracking operation, is performed at another processor).

Figure 2:
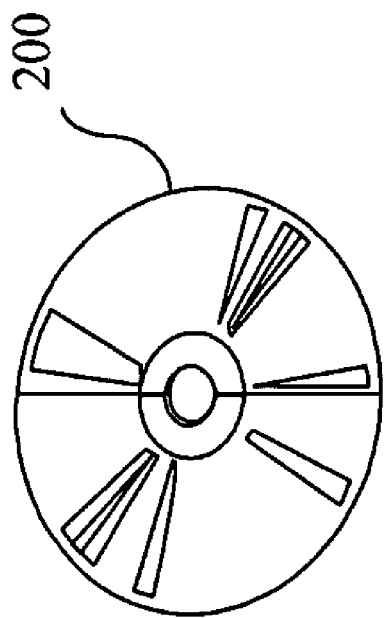
FIG. 2 is an illustrative diagram of a computer program product embodying the present invention.

An illustrative diagram of a computer program product embodying the present invention is depicted in FIG. 2. The computer program product 200 is depicted as an optical disk such as a CD or DVD. However, as mentioned previously, the computer program product generally represents computer readable code stored on any compatible computer readable medium.

(3) Introduction

The present invention includes method, apparatus, and computer program product aspects that assist in object surveillance (e.g. object detection and tracking). A few non-limiting examples of applications in which the present invention may be employed include vehicle detection and tracking in automotive safety systems, intruder detection and tracking in building safety systems, and limb detection and tracking in gesture recognition systems. The Discussion, below, is presented in the context of an automobile safety system. However, it should be understood that it is contemplated that the invention may be adapted to detect and track a wide variety of other objects in a wide variety of other situations.

Figure 3:
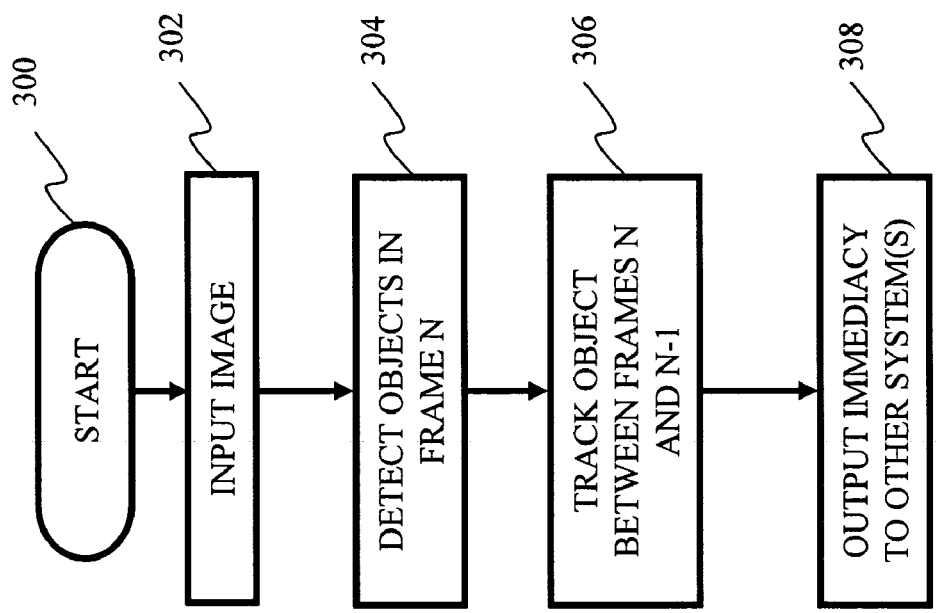
FIG. 3 is a flow diagram depicting the general operations of the present invention.

A simple flow chart presenting the major operations of a system incorporating the present invention is depicted in FIG. 3. After starting 300, the system receives a plurality of inputted images 302. Each image in the plurality of images is provided to an object detecting module 304, where operations are performed to detect objects of interest in the images. After the objects in a particular image N are detected, the image is provided to an object tracking module 306, where the current image N is compared with the image last received (N−1) in order to determine whether any new objects of interest have entered the scene, and to further stabilize the output of the object detecting module 304. The output of the overall system is generally a measure of object immediacy. In the case of automobile safety, object immediacy refers to the proximity of other vehicles on the road as a rough measure of potential collision danger. This output may be provided to other systems 308 for further processing.

The Discussion presented next expands on the framework presented in FIG. 3 to provide the details of the operations in the object detecting module 304 and the object tracking module 306. In each case, details regarding each operation in each module are presented alongside a narrative description with accompanying illustrations showing the result at every step. These figures are considered to be non-limiting illustrations to assist the reader in gaining a better general understanding of the function of each operation performed. Each of the images shown is 320×240 pixels in size, and all of the numerical figures provided in the Discussion are those used in operations on images of these sizes. However, these numbers are provided only for the purpose of providing context for the Discussion, and are not considered critical or limiting in any manner. Also, because the goal of the illustrations is to show the function of each operation of the modules, it is important to understand that the same image was not used to demonstrate all of the functions because many of them act as filters, and an image that clearly shows the function of one filter may pass through another filter with no change.

(4) Discussion a. The Object Detecting Module

The purpose of the object detecting module is to detect objects of interest in images in a computationally simple, yet robust, manner without the need for explicit assumptions regarding extraneous features (items not of interest) in the images. The object detecting module provides an edge-based constraint technique that uses each image in a sequence of images without forming any associations between the objects detected in the current image with those detected in previous or subsequent images. The final result of the process, in a case where the objects detected are vehicles on a road, is the detection of in-path and nearby vehicles in front of a host vehicle. The vehicle detection process is then followed by the vehicle tracking process to ensure the stability of the vehicle shapes and sizes as well as to make associations between vehicles in consecutive image frames. This step ensures that the vehicles in front of the host vehicle are not just detected, but also tracked. This capability is useful for making predictions regarding the position and velocity of a vehicle so as to enable preventative action such as collision avoidance or collision warning.

Figure 4:
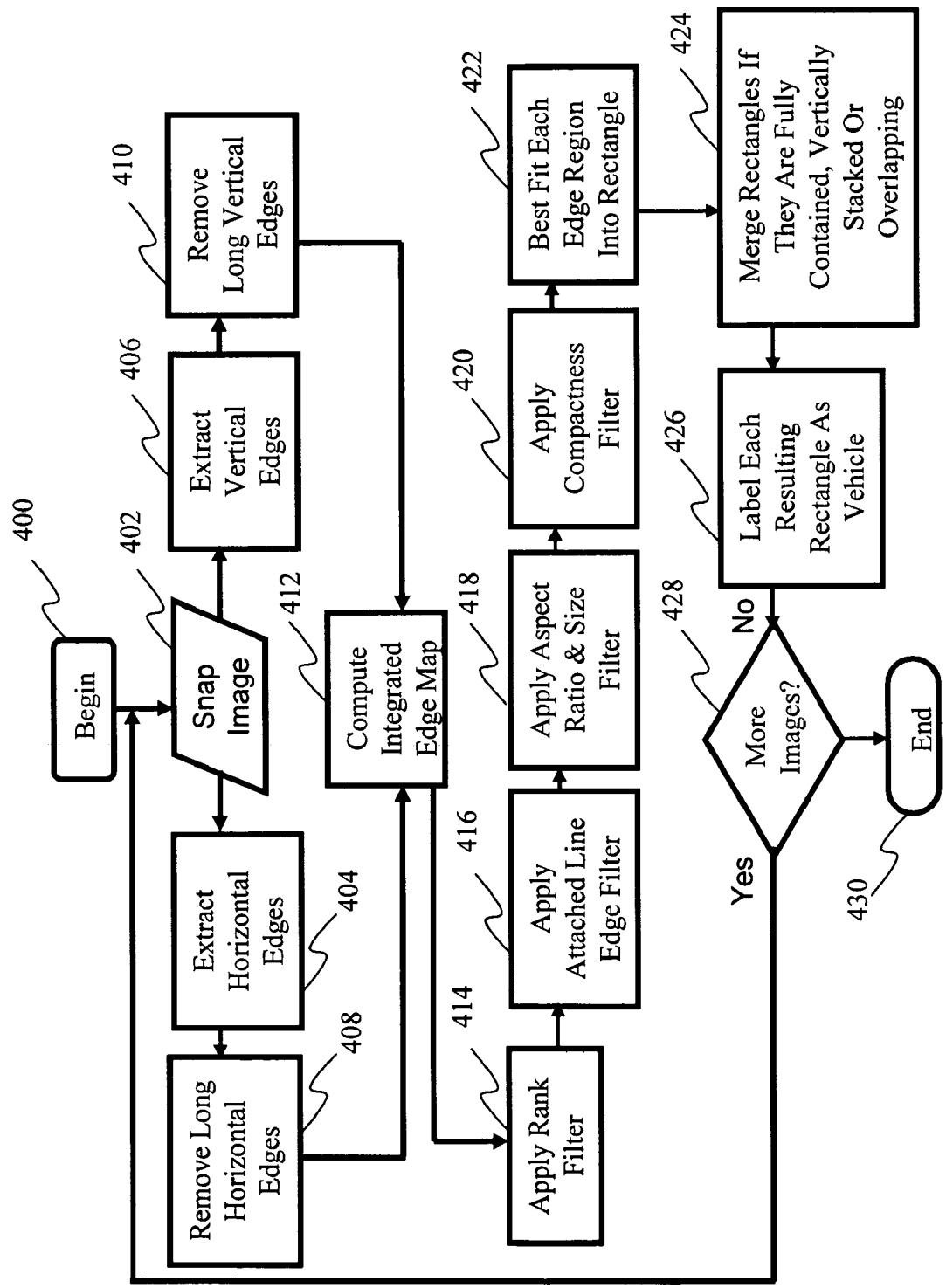
FIG. 4 is a flow diagram depicting more specific operations for object detection according to the present invention.

A flow diagram providing an overview of the operations performed by the object detecting module is presented in FIG. 4. Depending on the needs of a particular application, either the full set of operations or only a subset of the operations may be performed. The begin 400 operation corresponds to the start 300 operation of FIG. 3. Subsequently, an image is snapped or inputted into the system in an image snapping operation 402. Although termed an image snapping operation, block 402 represents any mechanism by which an image is received, non-limiting examples of which include receiving an image from a device such as a digital camera or from a sensor such as a radar imaging device. Typically, images are received as a series such as from a video camera, and the detection process is used in conjunction with the tracking process discussed further below. However, the detection operations may be performed independently of the tracking operations if only detection of objects in an image is desired. In the context of use for detecting and tracking vehicles, the image snapping operation 402 is performed by inputting a video sequence of road images, where the objects to be detected and tracked are vehicles in front of a host vehicle (the vehicle that serves as the point of reference for the video sequence).

Figure 5:
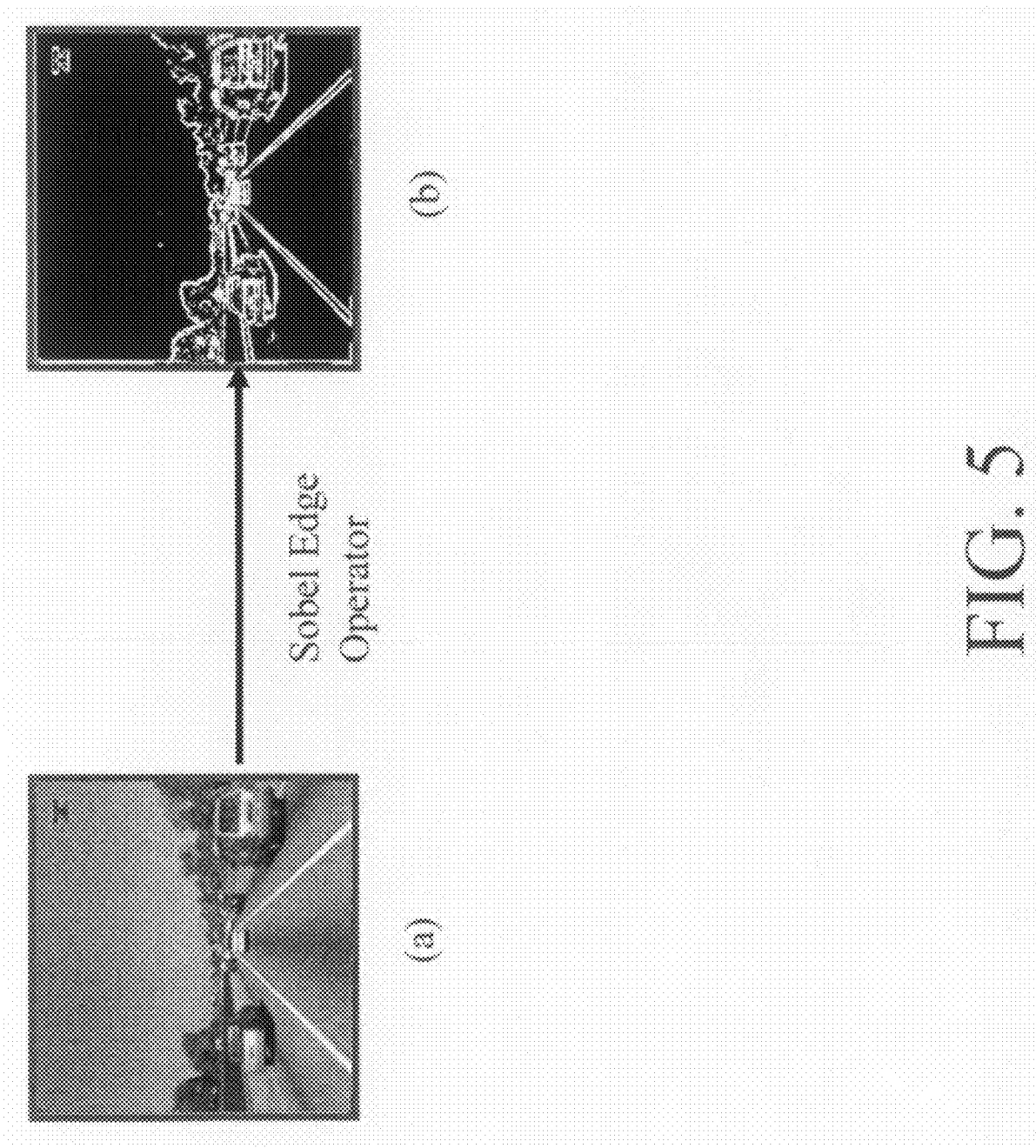
FIG. 5 presents an image and a corresponding edge map in order to demonstrate the problems associated with one-step edge extraction from the image, where

After the image snapping operation 402 has been performed, edges are extracted from the image. The edges may be extracted in a single step. However, it is advantageous to independently extract horizontal and vertical edges. Most edge-extraction operations involve a one-step process using gradient operators such as the Sobel or the Canny edge detectors, both of which are well-known in the art. However, unless the object to be detected is already well-separated from the background, it is very difficult to directly segment the object from the background using these edges alone. This difficulty is referred to as "figure-ground separation". To more clearly illustrate this issue, FIG. 5 presents an image and a corresponding edge map in order to demonstrate the problems associated with one-step edge extraction from the image. The original image is labeled FIG. 5(a), and the image after edge-extraction is labeled FIG. 5(b). With reference to FIG. 5 (b), it can be seen that the edges pertaining to the vehicle remain connected with the edges of the background, such as the trees, fence, lane edges, etc. While the vehicle edges themselves are still clearly visible, the problem of separating them from the background is difficult without additional processing. The operations shown in FIG. 4 provide a better approach for edge extraction for purposes of the object detection module. In this approach, vertical and horizontal edges are separately extracted, for example with a Sobel operator. The separate extraction operations are depicted as a horizontal edge extraction operation 404 and a vertical edge extraction operation 406. It is important to note, however, that the extraction of horizontal and vertical edges is useful for detecting the shapes of automobiles. In cases where the objects to be detected are of other shapes, other edge extraction operations may be more effective, depending on the common geometric features of the objects.

Figure 6:
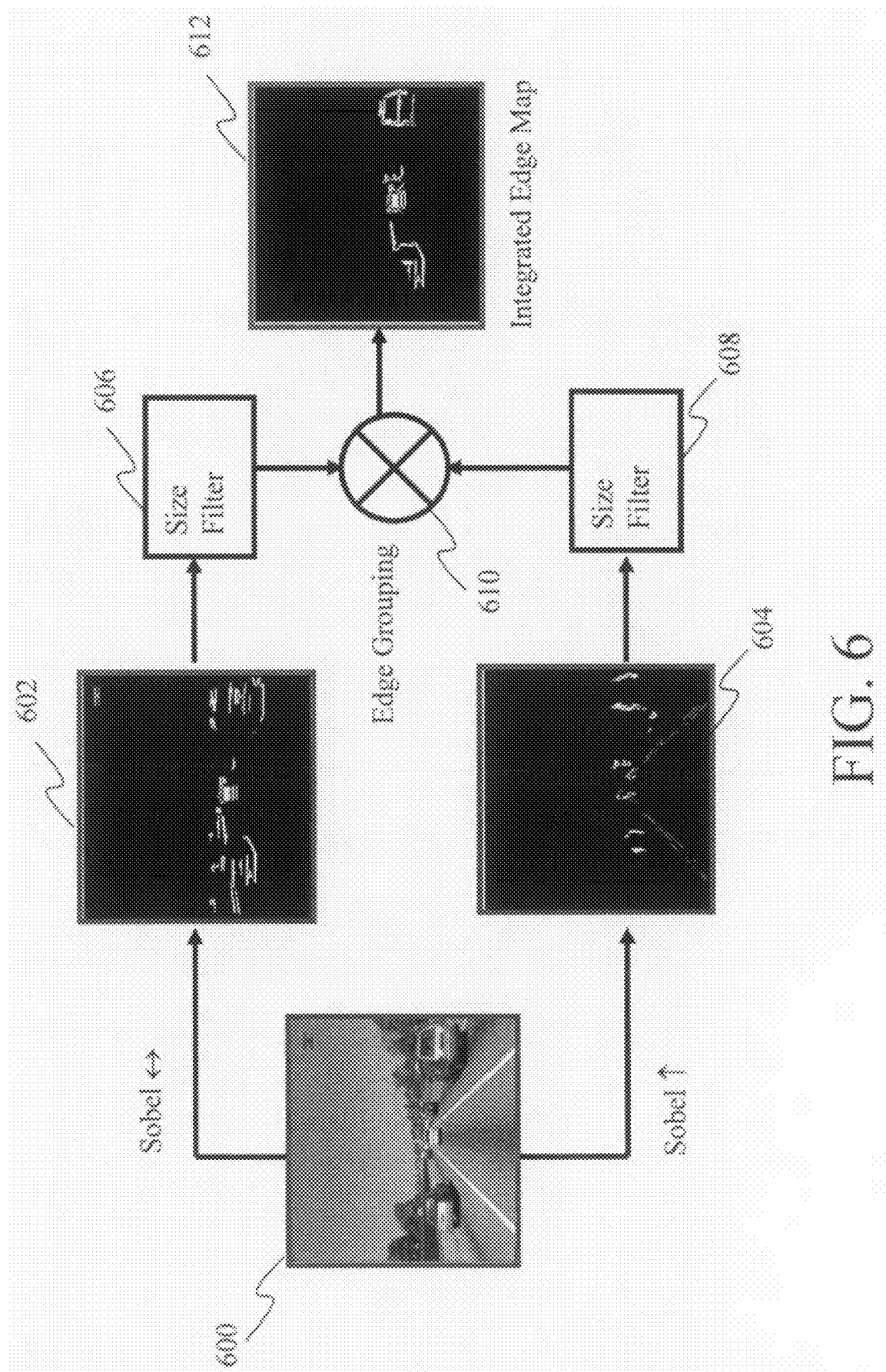
FIG. 6 is a flow diagram illustratively depicting the horizontal/vertical edge detection, size filtration, and integrated edge-map production steps of the present invention, resulting in an integrated edge-map.

After the horizontal edge extraction operation 404 and the vertical edge extraction operation 406 have been performed, it is desirable to further filter for edges that are unlikely to belong to objects sought. In the case of automobiles, the horizontal and vertical edges generally have known length limits (for example, the horizontal edges representing an automobile are generally shorter than the distance between two neighboring lanes on a road). Thus, operations are performed for eliminating horizontal edges and vertical edges that exceed a length-based threshold, and are represented by horizontal and vertical edge size filter blocks 408 and 410, respectively. The results of these operations are merged into an integrated (combined) edge map in an operation of computing an integrated edge map 412. The results of the horizontal and vertical edge extraction operations, 404 and 406, as well as of the horizontal and vertical edge size filter operations, 408 and 410, and the operation of computing an integrated edge map 412 are shown illustratively in FIG. 6. In this case, the original image 600 is shown before any processing. The images with the extracted horizontal edges 602 and with the extracted vertical edges 604 are shown after the operation of Sobel edge detectors. Size filter blocks 606 and 608, respectively, indicate size filtrations occurring in the horizontal and vertical directions. In a the image shown, the filters removed horizontal edges in excess of 50 pixels in length and vertical edges in excess of 30 pixels in length. These thresholds were based on a priori knowledge about the appearance of vehicles in an image of the size used. In addition, vehicles on the road are typically closer to the bottom of an image, vertical edges that begin at the top of the images were also filtered out. An edge grouping operation is performed for the operation of computing an integrated edge map, and is represented by block 610. In the case shown, the horizontal and vertical edges were grouped into 8-connected regions based on proximity. Thus, if a horizontal edge was close in position to a vertical edge, then they were grouped. The result of the process is shown in image 612. By applying the operations thus far mentioned, the edges extracted are far more meaningful, as may be seen by comparing the image 612 of FIG. 6 with the image shown in FIG. 5(*b*), where most of the vehicle edges have been separated from the background edges.

Figure 7:
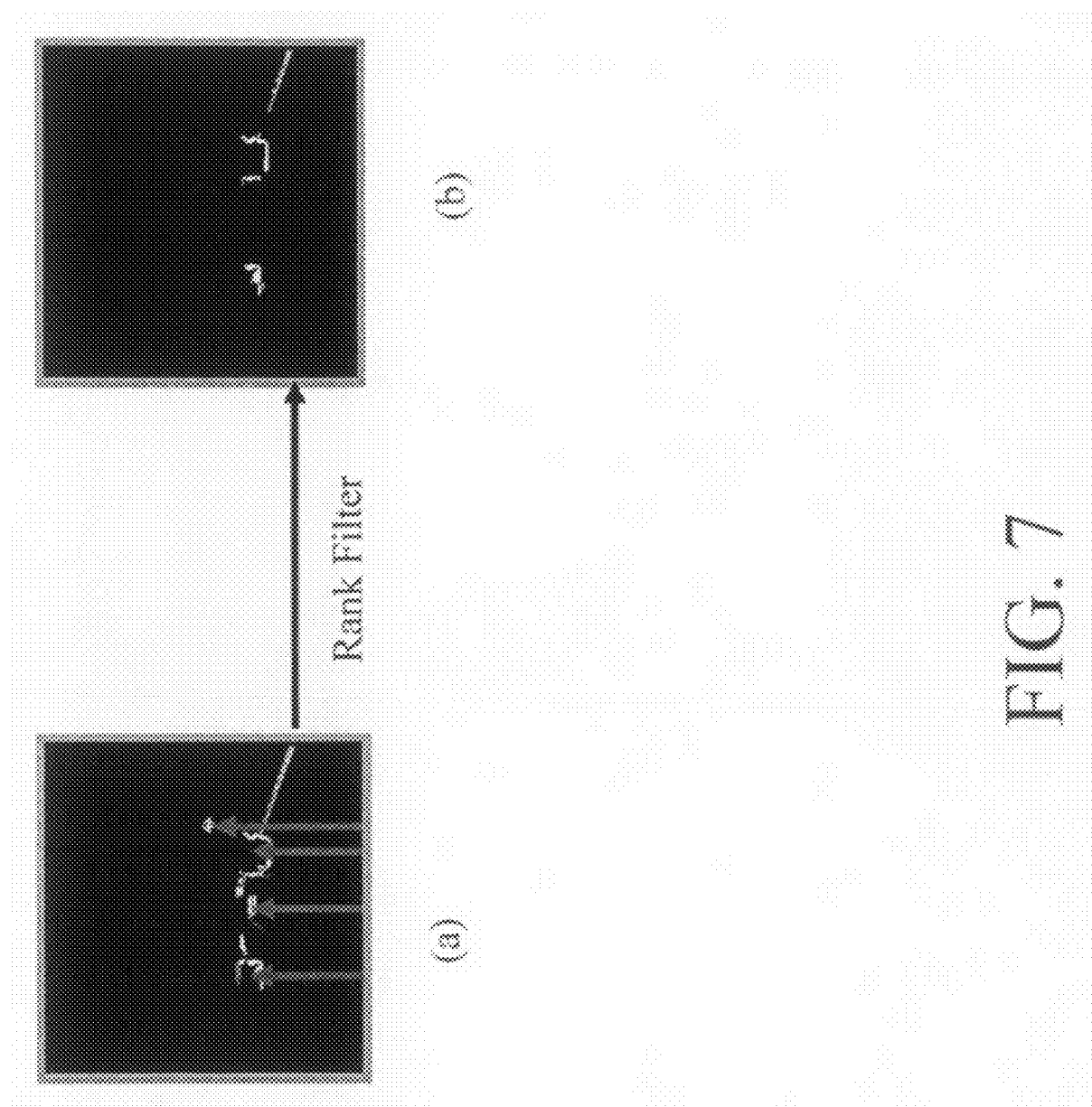
FIG. 7 is an illustrative diagram showing the application of the rank filter to the edge-map produced in FIG. 7 to generate a modified edge-map, where

After the operation of computing an integrated edge map 412 has been performed, each surviving 8-connected edge is treated as an edge region. These edge regions are further filtered using a rank filter 414. The rank filter 414 identifies edge regions that are closer to a reference point (in the case of automotive systems, the host vehicle) and retains them while filtering those that are farther away and thus less immediate. In the case of a vehicle, this has the effect of removing vehicles that constitute a negligible potential threat to the host vehicle. In the operation of the rank filter 414 for vehicle detection, first the host vehicle is hypothesized to be at the bottom center of the image. This is a reasonable hypothesis about the relative position of the host vehicle with respect to the other vehicles in the scene, given that there is a single image and that the camera is mounted facing forward on the vehicle (a likely location is in on top of the rear-view mirror facing forward). In this automotive scenario, where the bottom of the image is used as the reference, in order to identify the edge regions that are closest to the vehicle, the vertical offset from the image bottom (the host vehicle) to the centroid of each edge region is computed. The result of this operation is shown in the image depicted in FIG. 7(*a*), where a vertical arrow (in the "Y" direction in a Cartesian coordinate system superimposed on the image) represents the distance between the bottom of the image and the centroid of each of the four edge regions. The length of each offset is then divided by the number of pixels in its corresponding edge region in order to obtain a normalized distance metric for each edge region. Thus, the metric is smaller for an edge region that has an identical vertical offset with another edge region but is bigger in area. This makes the result of the rank filter 414 more robust by automatically rejecting small and noisy regions. The edge regions are then ranked based on the normalized distance metric in an ascending order. Edges above a predetermined rank are removed. This is akin to only considering vehicles below a certain number. In the images presented, a cut-off threshold of 10 was used, although any arbitrary number may be used, depending on the needs of a particular application. Note that because this measure does not include a cut-off directly relating to horizontal position, vehicles in nearby lanes that have the same vertical offset will be considered. The result of applying the rank filter 414 to the image shown in FIG. 7(*a*) is depicted in FIG. 7(*b*).

Figure 8:
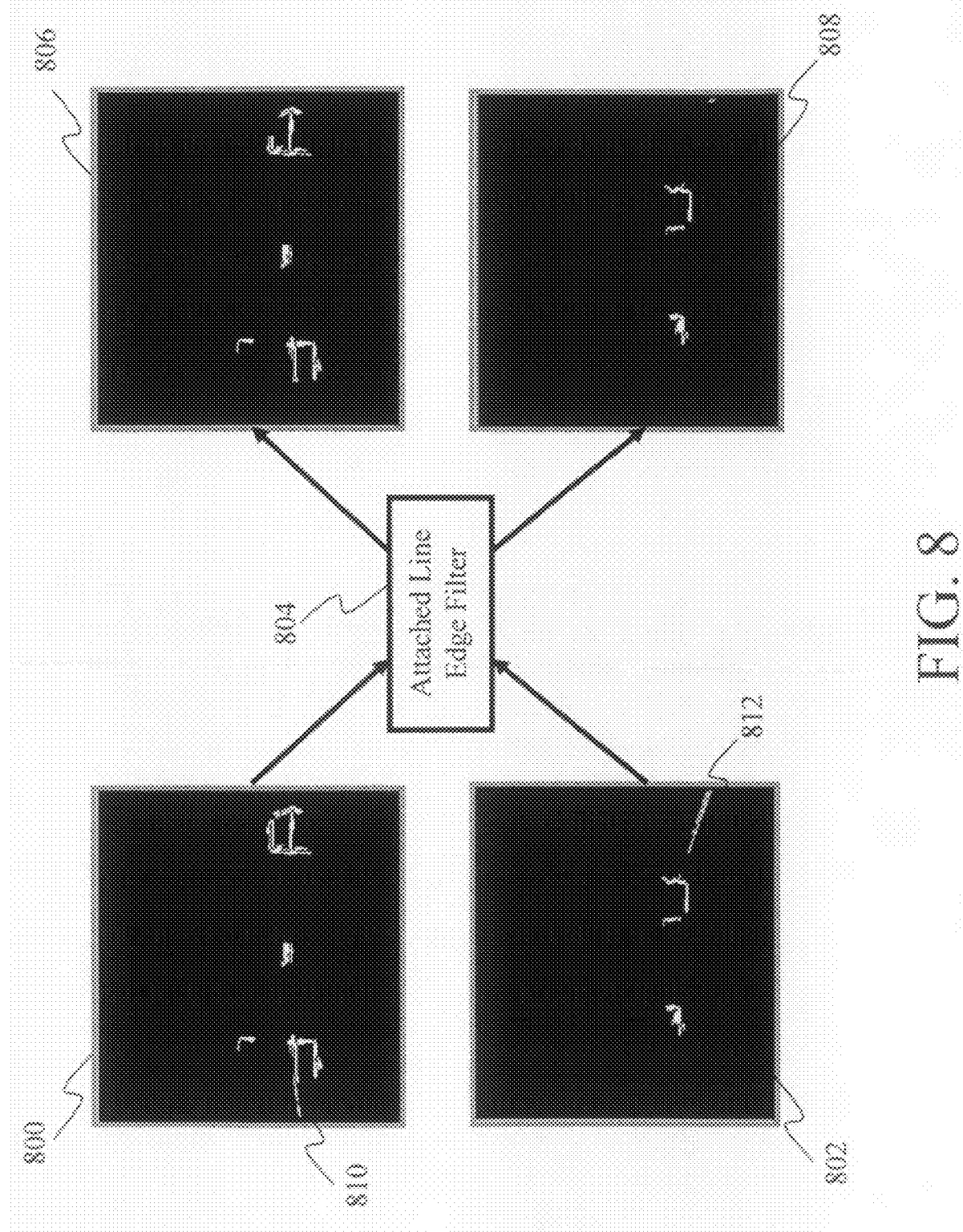
FIG. 8 is an illustrative diagram showing the application of an attached line edge filter to a modified edge-map.

The edge regions remaining after the rank filter 414 has been applied are then provided to an attached line edge filter 416 for further processing. When horizontal and vertical edge responses are separately teased out and grouped as described above, one remaining difficulty, particularly in the case of vehicle detection where vertical and horizontal edges are used for object detection, is that oriented lines receive almost equal responses from both the horizontal and vertical edge extraction operations, 404 and 406, respectively. Thus, some of these oriented line edges can survive and remain attached to the vehicle edge regions. Predominantly, these oriented edges are from lanes and road edges. The attached line edge filter 416 is applied in order to remove these unwanted attachments. In this filtering process, each edge region from the output of the rank filter is processed by a Hough Transform filter. Hough Transform filters are well-known for matching and recognizing line elements in images. So, a priori knowledge regarding the likely orientation of these unwanted edge segments can be used to search for oriented edge segments within each edge region that match the orientation of potential lanes and other noisy edges that normally appear in edge maps of roads. Before deleting any matches, the significance of the match is determined (i.e., whether the significance is greater exceeds threshold for that orientation alone). Two images are depicted in FIG. 8, both before and after the application of the attached line edge filter. A first image 800 and a second image 802 are shown before processing by the attached line edge filter 804. A first processed image 806 and a second processed image 808, corresponding to the first image 800 and the second image 802, respectively, are also shown. Comparing the first processed image 806 with the first image 800, it can be seen that a road edge region 810 was removed by the attached line edge filter 804. Also, comparing the second processed image 808 with the first image 802, it can be seen that a free-standing road edge 812 was removed by the attached line edge filter 804.

Figure 9:
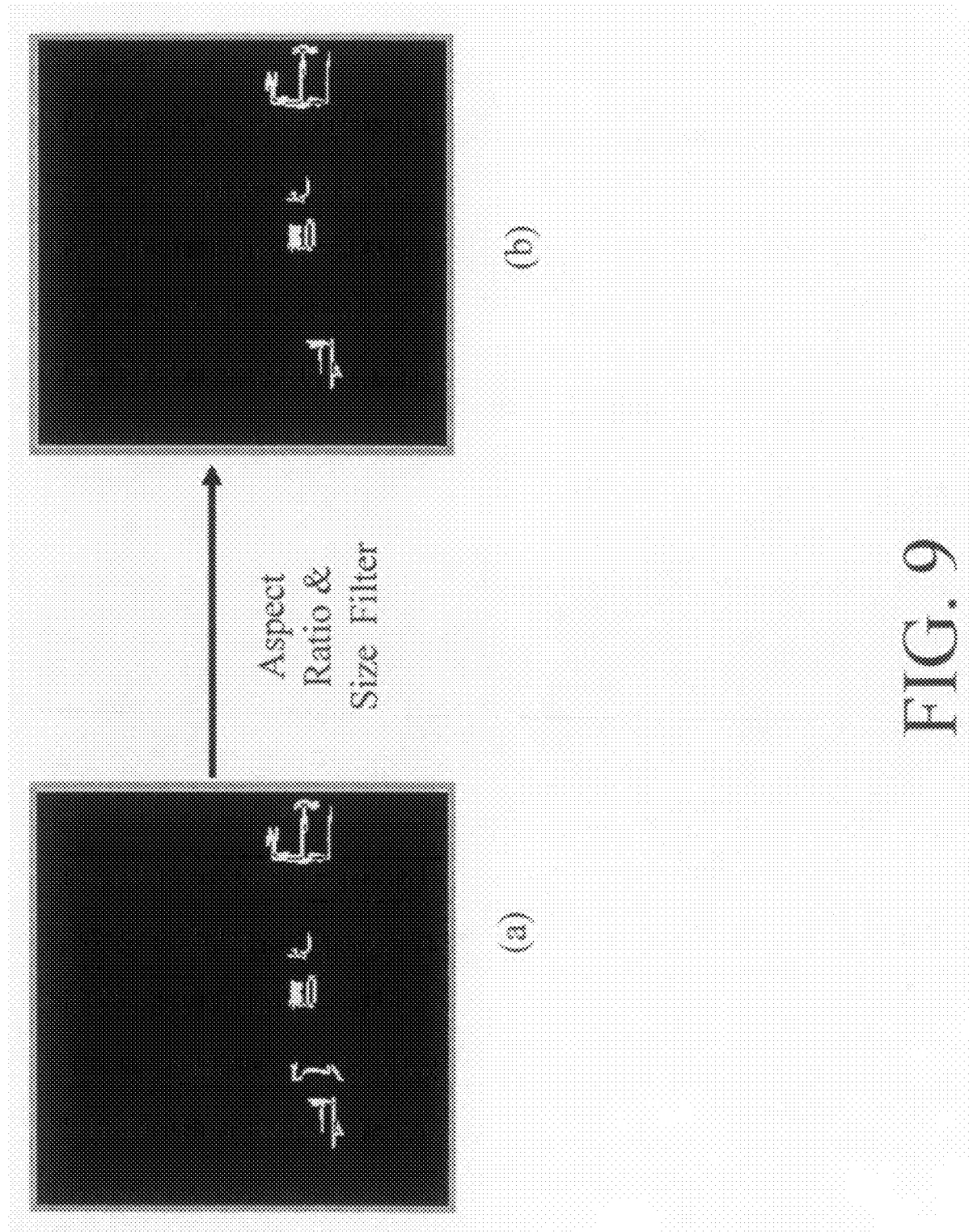
FIG. 9 is an illustrative diagram showing the application of an aspect ratio and size filter to the image that resulted from application of the attached line edge filter, where

Referring again to FIG. 4, after the attached line edge filter 416 has been applied, each surviving edge region is bounded by a minimum enclosing rectangle. The rectangles are then tested based on an aspect ratio and size criterion through the application of an aspect ratio and size filter 418. This operation is useful when detecting objects that tend to have a regular aspect ratio and size. In the detection of vehicles, it is known that they are typically rectangular, with generally consistent aspect ratios. Vehicles also typically fall within a certain size range. For the pictures presented with this discussion, a threshold of 3.5 was used for the aspect ratio (the ratio of the longer side to the smaller side of the minimum enclosing rectangle). The size threshold used was 2500 pixels (equal to about 1/30 of the pixels in the image—the size threshold measured in pixels typically varies depending on image resolution). An example of the application of the aspect ratio and size filter 418 is shown in FIG. 9, where FIG. 9(*a*) and FIG. 9(*b*) depict an image before and after the application of the aspect ratio and size filter 418. Comparing the image shown in FIG. 9(*b*) with the original image used in its production, which is shown in FIG. 5(*a*) (and as image 600 in FIG. 6), it can be seen that the remaining edges provide a good isolation of the four nearest cars in front of the camera.

Figure 10:
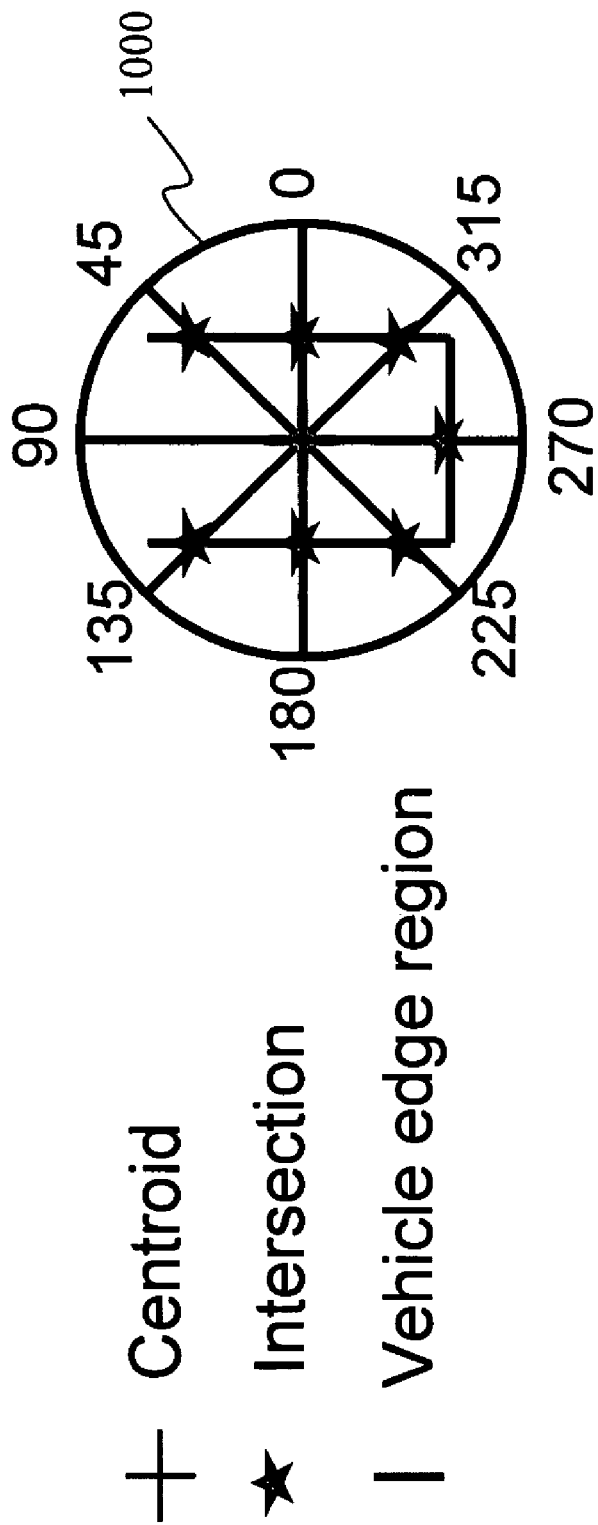
FIG. 10 is an illustration of a compactness filter that may be applied to an object region to ensure that it fits a particular geometric constraint.
Figure 11:
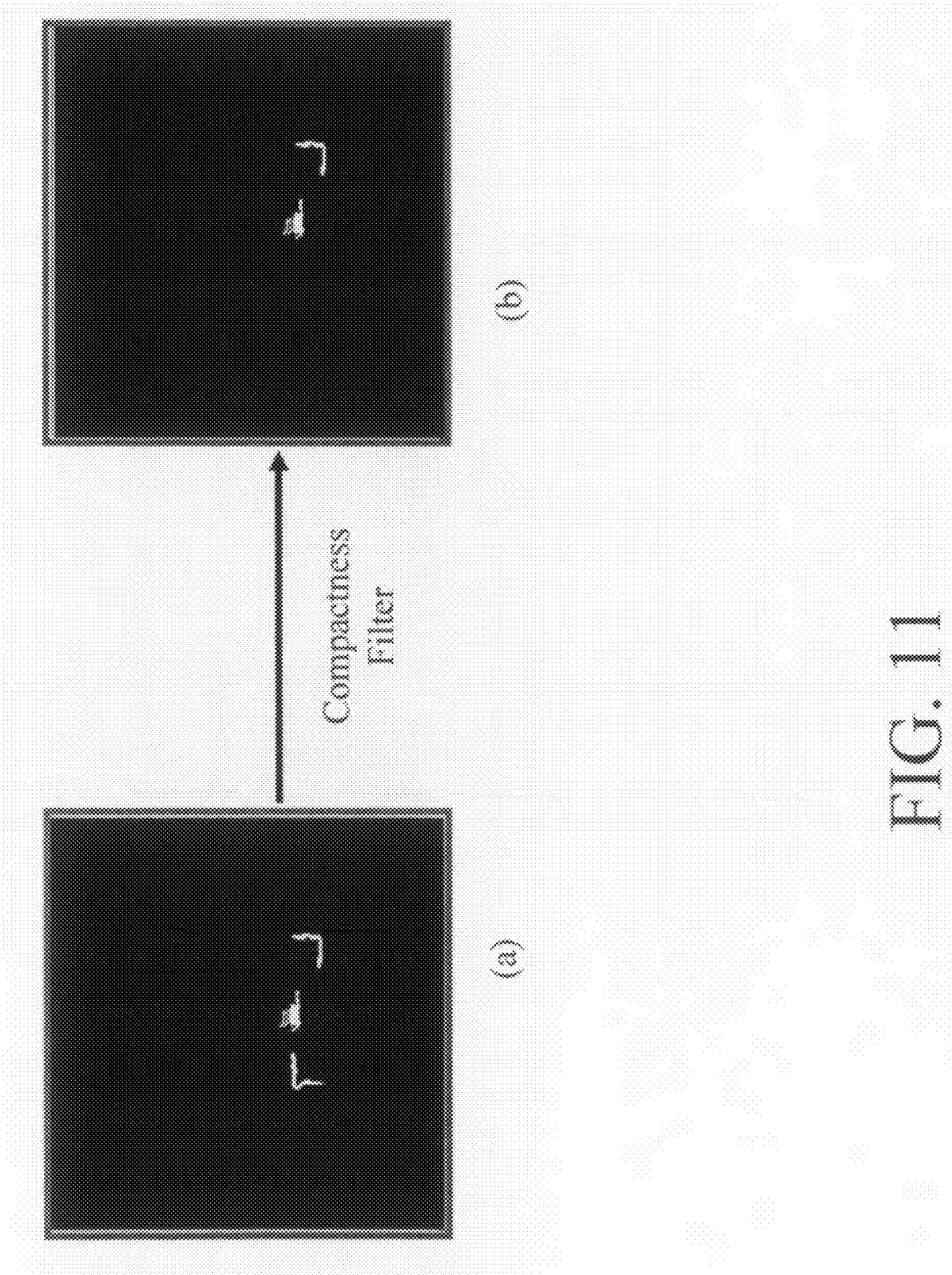
FIG. 11 is an illustrative diagram showing the result of applying the compactness filter shown in FIG. 10 to a sample image, where

Referring back to FIG. 4, the next operation in the detection scheme is the application of a compactness filter 420. The compactness filter 420 is a mechanism by which the remaining edge regions are matched against a geometric pattern. The specific geometric pattern used depends on the typical shape of objects to be detected. For example, in the case of vehicles discussed herein, the geometric pattern (constraint) used is a generally "U"-shaped pattern as shown in FIG. 10. In general, a reference point on the geometric pattern is aligned with a reference point on the particular edge region to be tested. After this alignment, various aspects (such as intersections between the geometric pattern and the edge region at different angles, amount of area of the edge region enclosed within the geometric pattern, etc.) of the relationship between the edge region and the geometric pattern are tested, with acceptable edge regions being kept, and others being excluded from further processing. In the case shown, the centroid of each remaining edge region was computed and was used as the reference point on the edge region. This reference point was then aligned with the centroid 1000 of the geometric pattern. From the aligned centroids, a search was performed along lines in eight angular directions (360 degrees is divided into 8 equal angles) for an intersection with the edge region. Lines representing the search (search lines) are shown in FIG. 10, with 45 degree angular separations. In this case, the linear distance between the centroid and the point of intersection of the edge region must also be greater than 3 pixels. Given this, an intersection is registered for more than 4 angular directions, and then the rectangular region is labeled compact providing one of the intersections is with the bottom vertical direction. The implication of this condition in the case of vehicle detection is that the representative edge region must have contact with the road, which is always below the centroid of the vehicle. An example of the result of an application of the compactness filter 420 is shown in FIG. 11, where the image of FIG. 11(*a*) depicts a set of edge regions prior to the application of the compactness filter 420 and FIG. 11(*b*) depicts the same set of edge regions after the application of the compactness filter 420.

Figure 12:
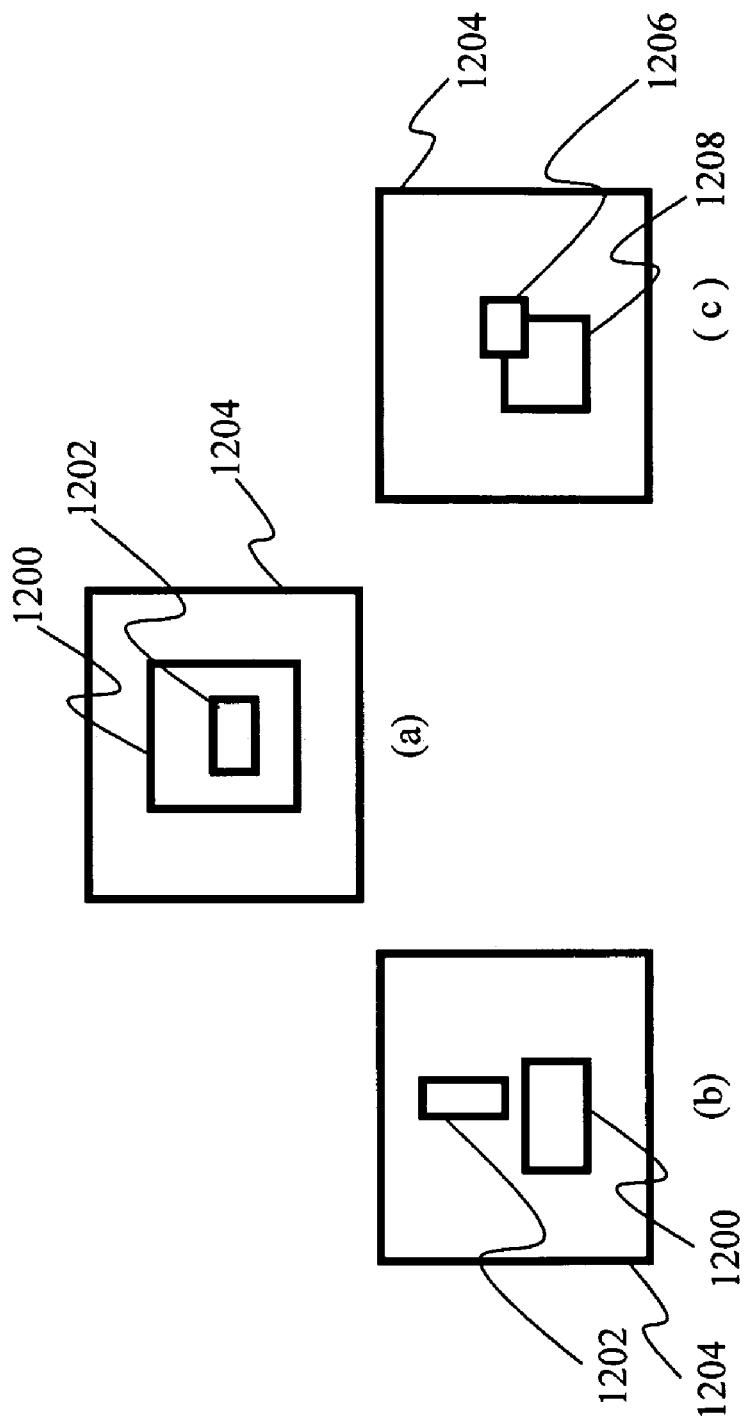
FIG. 12 is an illustrative diagram depicting situations where regions within the image are merged into one region; more specifically.

The edge regions remaining after the application of the compactness filter 420 are then each fitted with a minimum enclosing rectangle in a rectangle-fitting operation 422. FIG. 12 provides illustrative examples of the operations performed on various minimum enclosing rectangle configurations where 1200 represents the rectangle to be kept and 1202 represents the rectangle to be removed within an image 1204. In FIG. 12(*a*), the overlapping rectangle 1202 is removed from the image. In FIG. 12(*b*), the vertically stacked rectangle 1202 above another rectangle 1200 is removed. In FIG. 12(*c*), a case is shown where two rectangles 1206 and 1208 have a significant overlap. In this case, the overlapping rectangles are merged. The operations performed on the rectangle configurations are summarized as operation block 424 in FIG. 4. Each of the resulting rectangles is labeled as a vehicle 426, and the object detection module can either process more images or the process ends, as represented by decision block 428 and its alternate paths, one of which leads to the image snapping operation 402, and one of which leads to the end of the processing 430.

Figure 13:
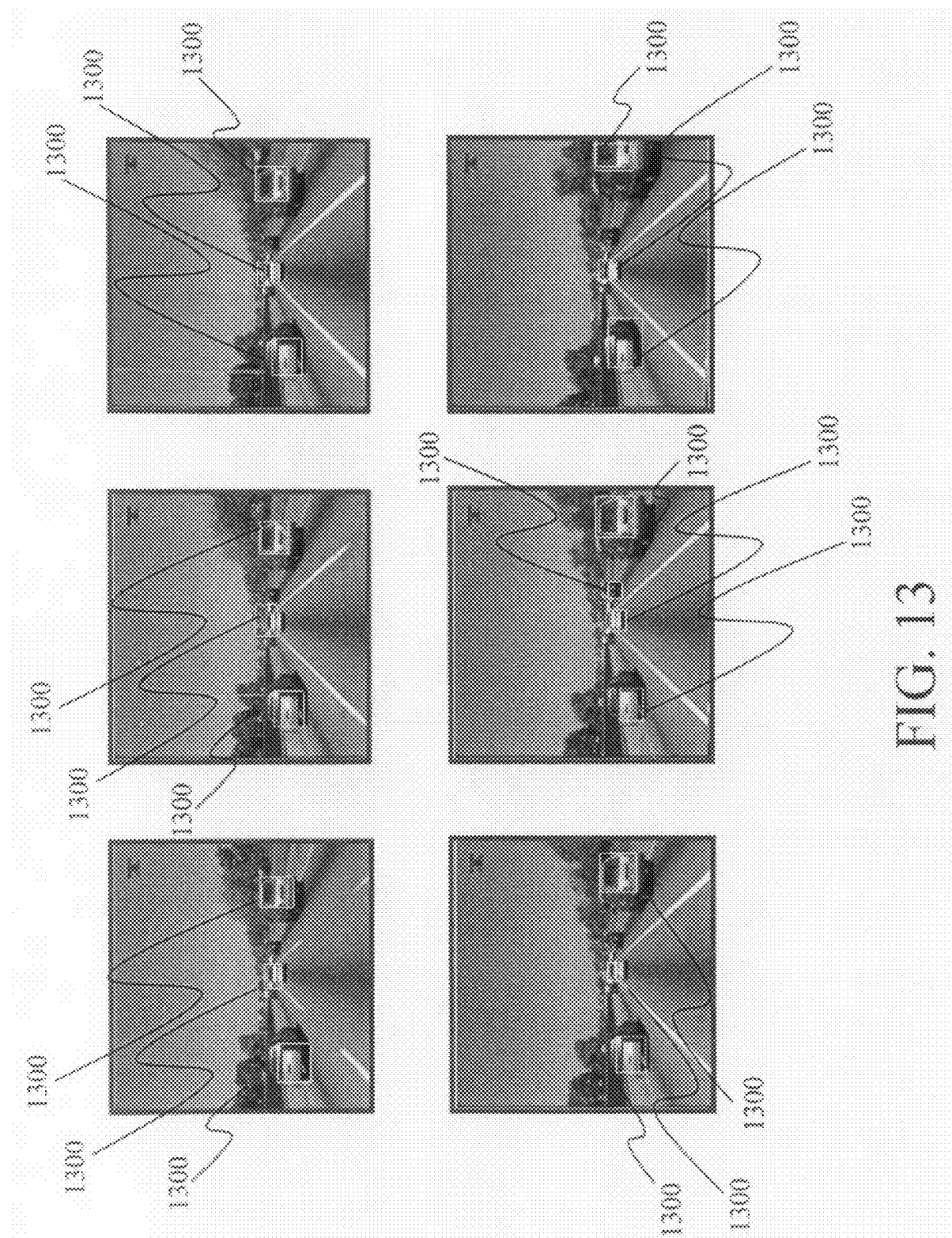
FIG. 13 presents a series of images depicting detected vehicles with the detection results superimposed in the form of white rectangles.

The result of application of the object detection module to several images is shown in FIG. 13. It should be noted here that detection results from one frame not used in the next frame. As a result, there exist variations in the size estimates of the vehicle regions, which are represented by enclosing rectangles 1300 in each frame. Further, the results do not provide any tracking information for any vehicle region and so they cannot be used for making predictions regarding a given vehicle in terms of its position and velocity of motion in future frames.

Next, the object tracking module will be discussed. The object tracking module complements and further stabilizes the output of the object detection module.

b. The Object Tracking Module

The object tracking module is used in conjunction with the object detection module to provide more robust results. The object tracking module provides a robust tracking approach based on a multi-component matching metric, which produces good tracking results. The use of only edge information in both the object detection module and the object tracking module make the present invention robust to illumination changes and also very amenable to implementation using simple CMOS-type cameras that are both ubiquitous and inexpensive. The object tracking module uses a metric for matching object regions between frames based on Euclidean distance, a sum-of-square-of-difference (SSD), and edge-density of vehicle regions. It also uses vehicle clusters in order to help detect new vehicles. The details of each operation performed by the object tracking module will be discussed in further detail below, with reference to the flow diagram shown in FIG. 14, which provides an overview of the tracking operations.

Figure 14:
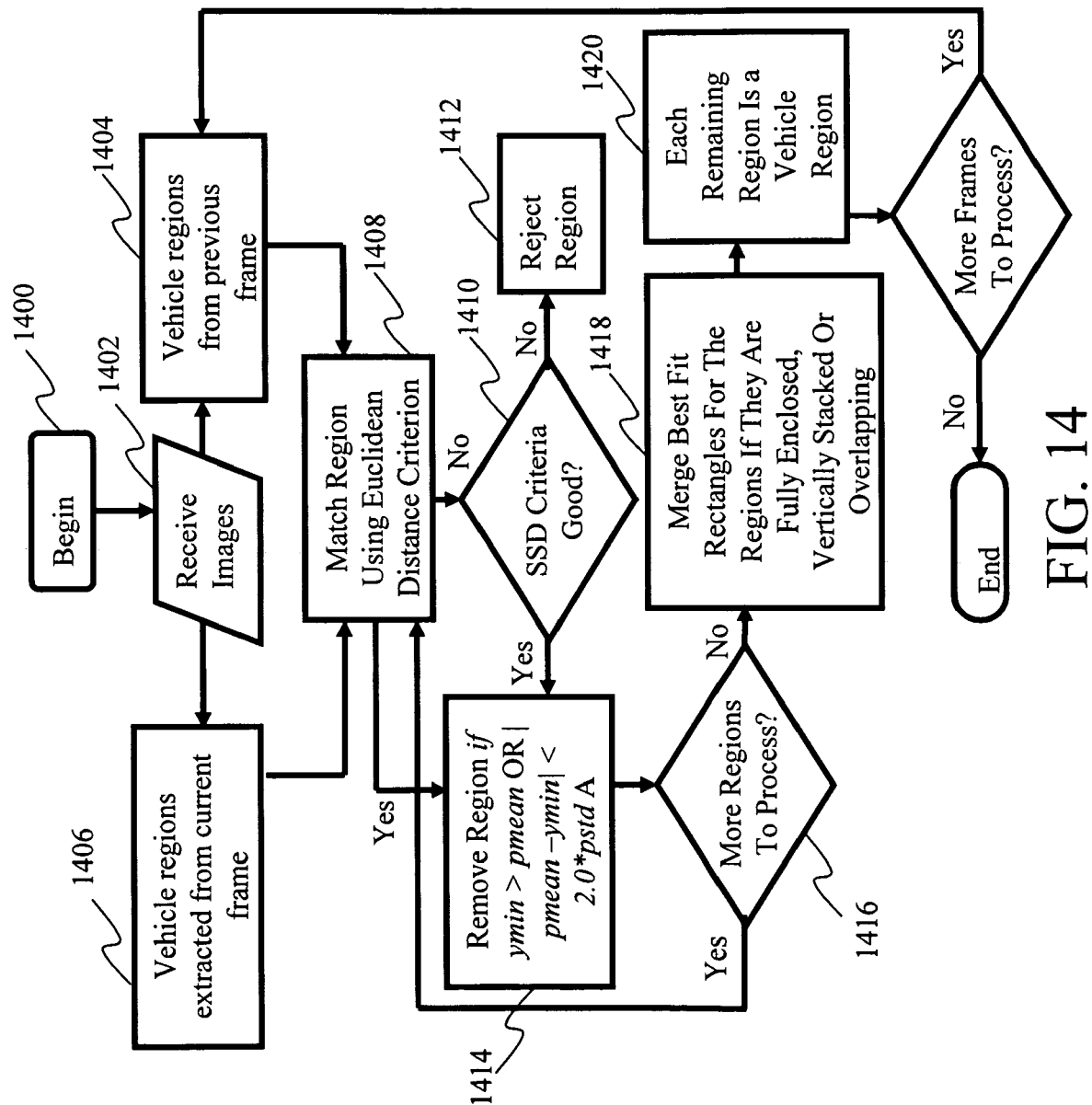
FIG. 14 is a flow diagram depicting more specific operations for object tracking over multiple image frames according to the present invention.

After the object tracking operations begin 1400, a series of images is received 1402. Two paths are shown exiting the image receiving operation 1402, representing operations using a first frame and operations using a next frame. Note that the terms "first frame" and "next frame", as used herein are intended simply to indicate two different frames in a series of frames, without limitation as to their positions in the series. In many cases, such as in vehicle detection, it is desirable that the first frame and the next frame be a pair of sequential images at some point in a sequence (series) of images. In other words, the first frame is received "first" relative to the next frame; the term "first" is not intended to be construed in an absolute sense with respect to the series of images. In the case of FIG. 14, the object tracking module is shown as a "wrap-around" for the object detection operation. The image receiving operation 1402 may be viewed as performing the same operation as the image snapping operation 402, except that the image receiving operation 1402 receives a sequence of images. Next, the object regions are extracted from both the first (previous) frame and the next (current) frame, as shown by operational blocks 1404 and 1406, respectively. The extraction may be performed, for example, by use of the object detection module shown in FIG. 4, with the result being provided to an operation of matching regions using the Euclidean distance criterion in combination with an edge density criterion, the combination being represented by operation block 1408. When used for vehicle detection and tracking, the vehicle regions detected in the previous frame and the current frame are first matched by position using the Euclidean distance criterion. This means that if the centroid of a vehicle (object) region detected in a previous frame is close (within a threshold) in position to the centroid of the vehicle region detected in the current frame, then they are said to be matched. In order to decide which of the two matched regions to adopt as the final vehicle region for the current frame, the matched regions are further subjected to an edge density criterion. The edge density criterion measures the density of edges found in the vehicle regions and votes for the region with the better edge density, provided that the change in size between the two matched regions is below a threshold. If either the Euclidean distance criterion or the edge density criterion is not met, then the algorithm proceeds to perform feature-based matching, employing a sum-of-square-of-difference (SSD) intensity metric 1410 for the matching operation. Normally, feature-based matching for objects involves point-based features such as Gabor or Gaussian derivative features that are computed at points in the region of interest. These features are then matched using normalized cross-correlation. In the context of vehicle detection, this implies that two regions are considered matched if more than a certain percentage of points within the regions are matched above a certain threshold using normalized cross-correlation. A drawback of using point-based feature approaches for dynamic tracking is the fact that rapid changes in scale of the vehicle regions due to perspective effects of moving away from or closer to the host vehicle can result in an incorrect responses by the filters (e.g., as Gabor or Gaussian derivative filters) that derive the features. This can lead to excessive mismatching.

Figure 15:
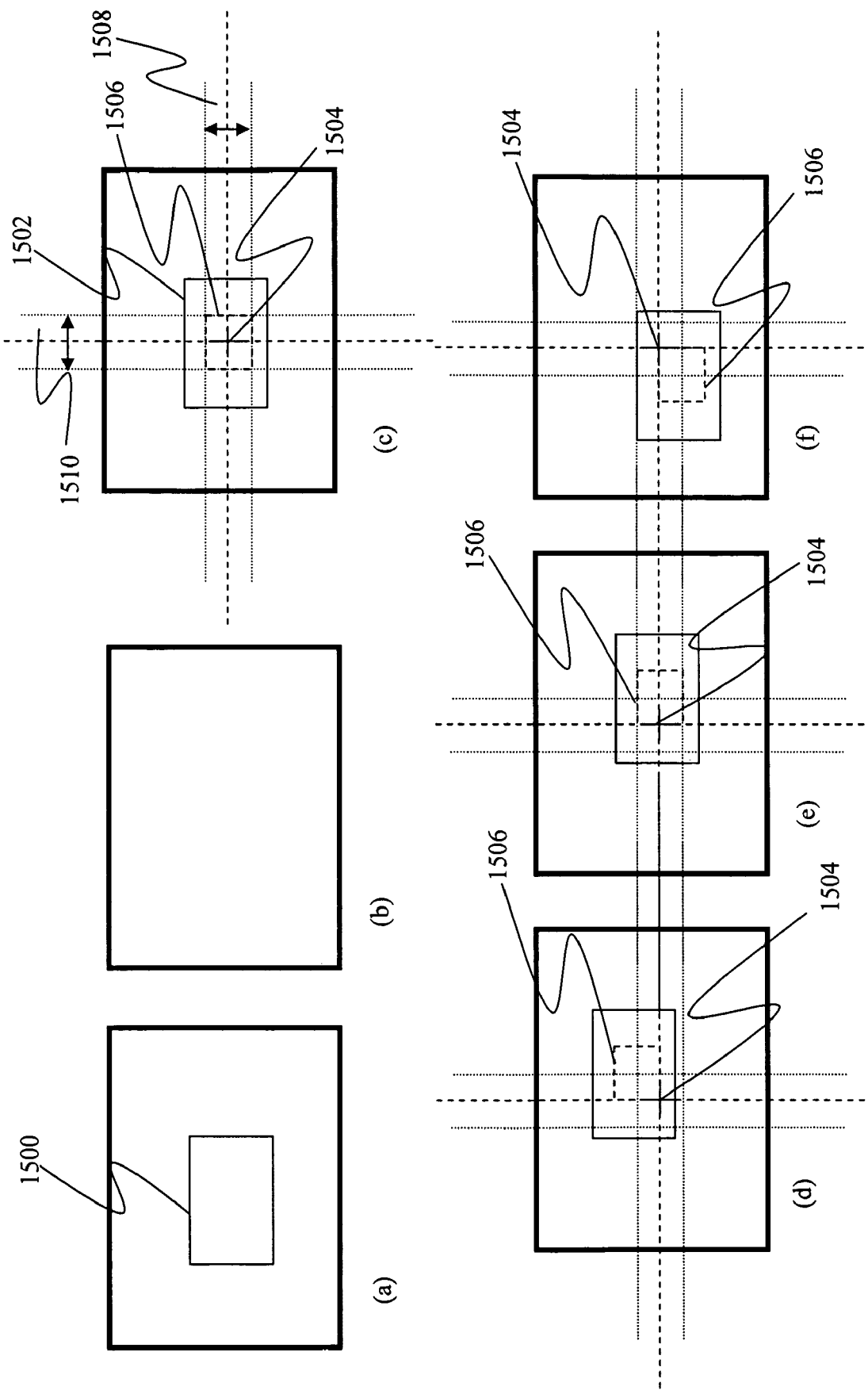
FIG. 15 is an illustration of the sum-of-square-of-difference in intensity of pixels technique applied with the constraint of a 5×5 pixel search window, where FIGS. 15(a) to (f) provide a narrative example of the operation for greater clarity.

In order to overcome this difficulty, a metric is employed for matching the intensity of the pixels within the region. An example of such a metric is the sum-of-square-of-difference (SSD) in intensity, which is relatively insensitive to scale changes. In order to generate a SSD in intensity metric 1410 for a region of interest, a matching template is defined, with approximately the same area as the region of interest. The matching template may be of a pre-defined shape and area or it may be adapted for use with a particular pair of objects to be matched. A search area constraint is used to limit the search area over which various possible object positions are checked for a match. In order to more clearly illustrate the SSD in intensity metric 1410, FIG. 15 presents an illustrative example of its operation. FIG. 15(*a*) shows an equivalent rectangle 1500 in an image resulting from operation of the object detection module. The image shown in FIG. 15(*a*) is the image previous to that of FIG. 15(*b*). Note that in FIG. 15(*b*), however, no object was detected. Because the object detection module does not provide any information for tracking between frames, and because for some reason the object that was properly detected in FIG. 15(*a*) was not detected in the subsequent image of FIG. 15(*b*), an alternative to the use of edge-based techniques must be used to attempt to detect the object in FIG. 15(*b*). In the case of vehicles, given a sufficiently high frame rate, an object is unlikely to move very far from frame to frame. Thus, the SSD in intensity technique attempts to detect an area of the subsequent image that is the same size as the equivalent rectangle in the previous image, which has an overall pixel intensity match with the subsequent image, and which has a centroid sufficiently close to the centroid of the equivalent rectangle in the previous image. This process is shown illustrated in FIG. 15(*c*) through FIG. 15(*f*). In the subsequent image, a search window 1502 equal in size to the equivalent rectangle 1500 in the previous image of FIG. 15(*a*) is positioned in the same location of the subsequent image as was the equivalent rectangle 1500 in the previous image. The result is shown in FIG. 15(*c*), where the point in the subsequent image in the same location as centroid of the equivalent rectangle 1500 in the first image is indicated by the intersection of its vertical and horizontal components 1504. Within the search window, a geometric search constraint 1506 is shown by a dashed-line box. The geometric search constraint 1506 and the search window 1502 are fixed relative to each other, with the geometric search constraint 1506 acting as a constraint to limit the movement of the search window 1502 about the fixed position of the centroid 1504. Double headed arrows 1508 and 1510 indicate the potential range of movement of the search window 1502 in the horizontal and vertical directions, respectively, given the limitations imposed by the geometric search constraint 1506. FIG. 15(*d*) shows the search window moved to the up and to the right to the limit imposed by the geometric search constraint 1506. Similarly, FIG. 15(*e*) shows the search window moved to the right to the limit imposed by the geometric search constraint 1506, while remaining centered in the vertical direction. FIG. 15(*f*) shows the search window moved to the down and to the left to the limit imposed by the geometric search constraint 1506. The SSD in intensity between the equivalent rectangle 1500 and the search window 1502 is tested at every possible position (given the geometric search constraint 1506). The position with the least SSD in intensity forms the hypothesis for the best match. This match is accepted only if the SSD in intensity is below a certain threshold. A mixture of the SSD in intensity and edge-based constrained matching may be performed to ensure robustness to noisy matches. In the approach used for the generation of images shown in the figures to which the SSD in intensity matching was applied, a 5×5 pixel window was used as the geometric constraint. This was further followed by computing the edge density within the window at the best matched position. If the edge density was above a threshold, then the regions from the two frames were said to be matched. If a region in the previous frame did not satisfy either the Euclidean distance criterion or the SSD in intensity matching criterion, then that region was rejected 1412. Rejection 1412 normally occurred either when a vehicle was being completely passed by the host vehicle, and was no longer in view of the camera, or when there was a sudden change in illumination which caused a large change in intensity or loss of edge information due to lack of contrast. It is noteworthy that this technique can be readily adapted for illumination changes by using cameras with high dynamic range capabilities.

Figure 16:
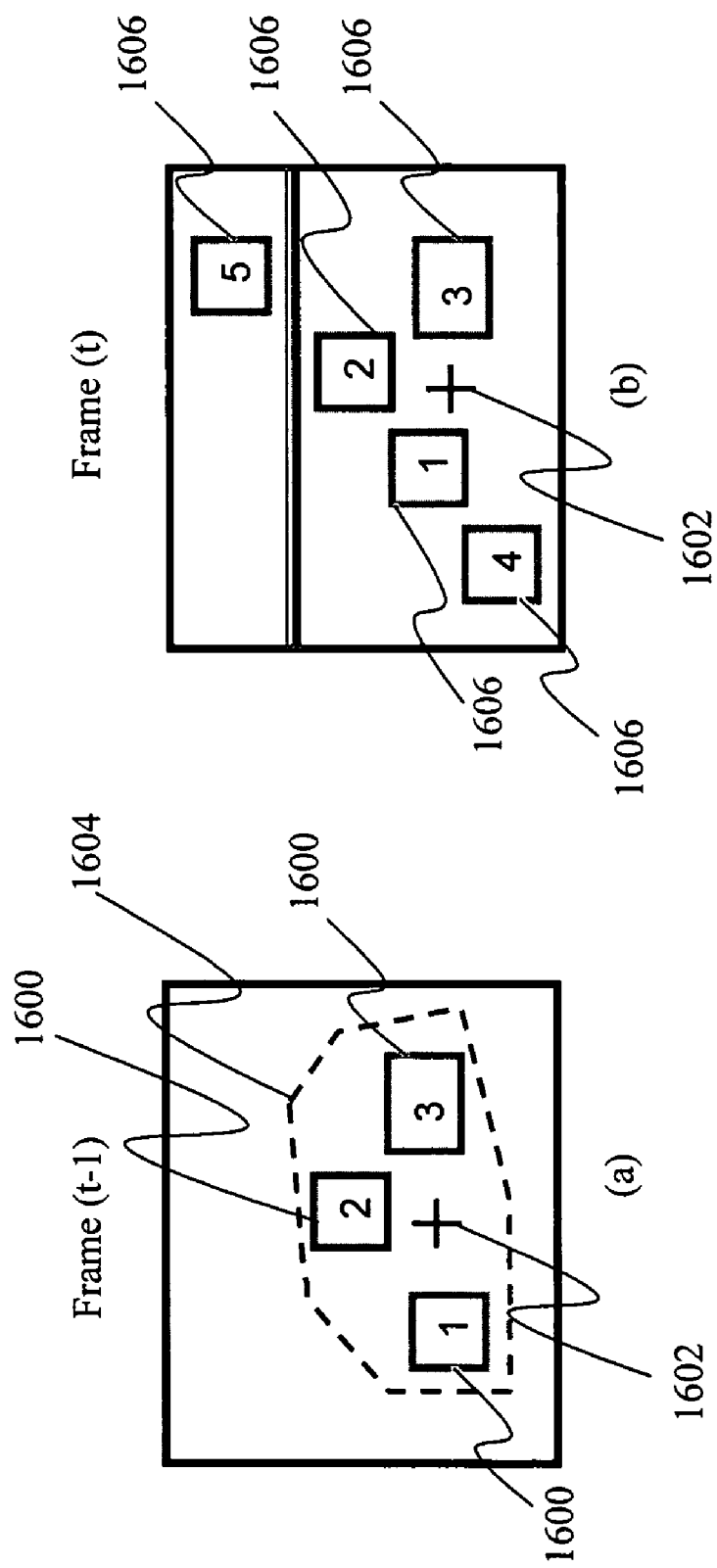
FIG. 16 is an illustration of the technique for adding or excluding objects from clusters, where

If a region from the current frame goes unmatched using both the Euclidean distance criterion/edge density criterion 1408 and the SSD intensity metric 1410, then the region must be rejected. However, if a region from the current frame satisfies either one of the Euclidean distance criterion/edge density criterion 1408 and the SSD intensity metric 1410, then, two possible conclusions may be drawn. The first conclusion is that the unmatched region is a newly appearing object (vehicle) that must be retained. The second conclusion is that the new region is a noisy region that managed to slip by all the edge constraints in the object detection module, and must be rejected. In order to ensure that the proper conclusion is made, a new cluster-based constraint for region addition is presented, and is depicted in FIG. 14 as a cluster-based constraint operation 1414. In application for vehicle tracking, this constraint is based on the a priori knowledge that any vehicle region that newly appears, and that is important from a collision warning point of view, is going to appear closer to the bottom of the image. Different a priori knowledge may be applied, depending on the requirements of a particular application. In order to take advantage of the knowledge that newly appearing vehicle regions are generally closer to the bottom of the image, a cluster is first created for the vehicles that were detected in the previous frame. The key information computed about the vehicle cluster is based on the mean and standard deviation in distance between the region centroids of the vehicles for the previous frame. If the minimum Y (vertical) coordinate (ymin) of the vehicle regions is greater than mean Y cluster coordinate of the vehicle cluster (pmean), then the regions must correspond to vehicles that are physically closer to the host vehicle, and must have just passed in front of the host vehicle. This implies that when a region in the current frame goes unmatched and ymin is greater than pmean, then the new vehicle region should be accepted. In order to accommodate vehicles that are merging from lanes on the side, regions with |pmean−ymin|<2.0*pstd are also accepted where (pmean, pstd) are the vehicle cluster mean and standard deviation from the previous frame. This cluster-based operation 1414 is depicted illustratively in FIG. 16, where three vehicle regions 1600 form a cluster with a mean position 1602 (pmean, denoted by a "+") and a standard deviation (pstd) in position 1604 in the previous frame (t−1) shown in FIG. 16(*a*). The number of vehicle hypothesis regions 1606 that are formed in the current frame (t) shown in FIG. 16(*b*) is five, but only three of them are matched using either the Euclidean distance criterion/edge density criterion 1408 or the SSD intensity metric 1410. Of the two remaining regions, only vehicle region 4 is accepted as new because it falls below the pmean+2.0*pstd limit 1608, while the vehicle region 5 is rejected because it falls outside the pmean+2.0*pstd limit 1608 (a boundary to the area in which objects are considered).

Figure 17:
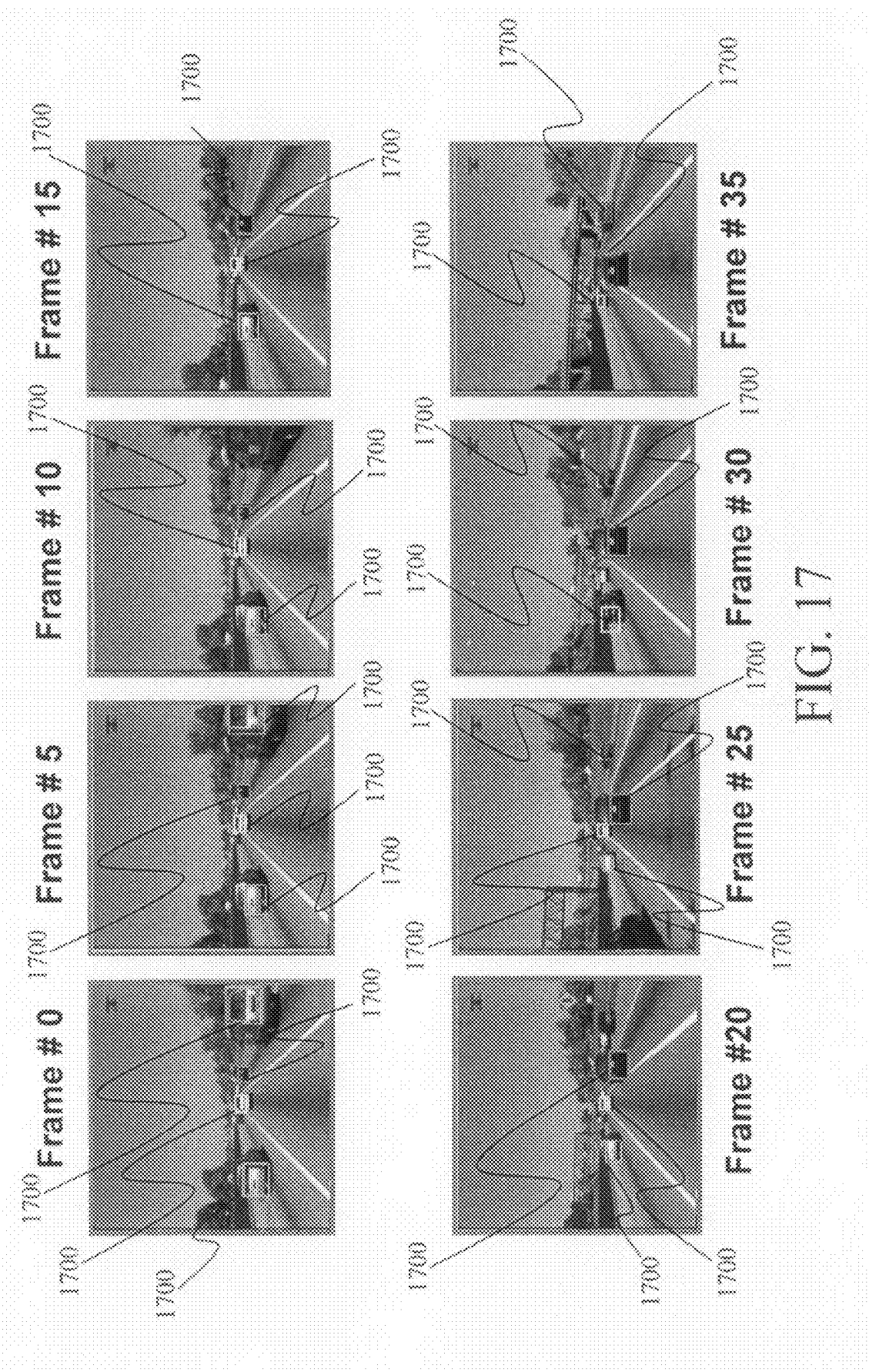
FIG. 17 is a series of images showing the overall results of the detection and tracking technique of the present invention, for comparison with the detection results shown in FIG. 13.

If there are more regions to process, the procedure is repeated beginning with the Euclidean distance criterion/edge density criterion 1408 until all of the remaining regions have been processed, as indicated by the decision block 1416. If all of the regions have been processed, the same operations that were performed by the object detection module on the rectangle configurations in the image (represented by operation block 424 in FIG. 4 and detailed in FIG. 12) are again performed. These operations are represented by operation block 1418. Each remaining region is accepted as an object (vehicle) region 1420 in the current frame. The object tracking module thus forms associations for regions from previous frames while allowing for new object regions to be introduced and prior regions to be removed as well. The combination of object detection with object tracking also helps compensate for situations where there is lack of edge information to identify an object region in a particular frame. These associations can easily be used to build motion models for the matched regions, enabling the prediction of an object's position and velocity. An example video sequence that uses the combination of vehicle detection and tracking is shown in FIG. 17. The effect of the object tracking module on the results obtained by the object detecting module versus the effect of the object detecting module, alone, may be seen by comparing the boxes 1300 of FIG. 13 to the boxes 1700 of FIG. 17. Of note is the stability of the sizes of the boxes representing the tracked vehicles in FIG. 17 as compared with those of FIG. 13. It is also noteworthy that perspective effects are well-handled by robust tracking despite reduction in vehicle size.

Summarizing with respect to object surveillance, the present invention provides a technique for automatically detecting and tracking objects in front of a host that is equipped with a camera or other imaging device. The object detection module uses a set of edge-based constraint filters that help in segmenting objects from background clutter. These constraints are computationally simple and are flexible to tolerate the wide variations, for example, those that occur in detection and tracking of vehicles such as cars, trucks and vans. Furthermore, the constraints aid in eliminating noisy edges. After object detection has been performed, an object tracking module can be applied for tracking the segmented vehicles over multiple frames. The tracking module utilizes a three-component metric for matching object regions between frames based on Euclidean distance, sum-of-square-of-difference (SSD), and edge-density of vehicle regions. Additionally, if the three-component metric is only partially satisfied, then object clusters are used in order to detect new vehicles.

c. Further Applications

Although the present invention has been discussed chiefly in the context of a vehicle surveillance system that can provide information to automotive safety systems such as collision warning systems and adaptive airbag deployment systems, it has a wide variety of other uses. By adjusting the filters and operations described, other types of objects may be detected and tracked.

Additionally, various operations of the present invention may be performed independently as well as in conjunction with the others mentioned. For example, the ranking filter may be applied to images, using the proper reference point, along with proper distance measures in order to rank any type of object detected by its immediacy. The compactness filter, with the proper geometric shape and properly chosen tests in relation to the geometric shape, may also be used independently in order to match objects to a desired pattern. Finally, though discussed together as a system, the object detection and object tracking modules may be used independently for a variety of purposes.

What is claimed is:

1. A method for the surveillance of objects in an image, the method comprising a step of detecting objects comprising sub-steps of:
   receiving an image including edge regions;
   independently extracting horizontal edges and vertical edges from the image;
   eliminating horizontal edges and vertical edges that exceed at least one length-based threshold;
   combining the remaining horizontal edges and vertical edges into edge regions to generate an integrated edge map; and
   applying a ranking filter to rank relative immediacies of objects represented by the edge regions in the integrated edge map.

2. A method for the surveillance of objects in an image as set forth in claim 1, wherein the sub-step of independently extracting horizontal and vertical edges is performed by use of a Sobel operator.

3. A method for the surveillance of objects in an image as set forth in claim 2, wherein after the sub-step of independently extracting horizontal and vertical edges, the horizontal and vertical edges are grouped into connected edge regions based on proximity.

4. A method for the surveillance of objects in an image as set forth in claim 1, wherein after the sub-step of independently extracting horizontal and vertical edges, the horizontal and vertical edges are grouped into connected edge regions based on proximity.

5. A method for the surveillance of objects in an image as set forth in claim 4, further comprising a step of selecting a fixed-size set of objects based on their ranking and discarding all other objects, whereby a modified image is generated.

6. A method for the surveillance of objects in an image as set forth in claim 5, further comprising a step of applying a compactness filter to the modified image to detect edge regions representing objects likely to be of interest.

7. A method for the surveillance of objects in an image as set forth in claim 6, wherein the step of applying the compactness filter comprises sub-steps of:
receiving an image including edge regions representing potential objects;
determining a geometric shape to apply as a compactness filter, with the geometric shape including a reference point;
determining an edge region reference on each edge region in the image, and aligning the reference point on each edge region with the reference point of the geometric shape;
extending search lines from the edge region reference in at least one direction; and
determining intersections of the search lines with the geometric shape, and if a predetermined number of intersections exists, classifying the edge region as a compact object.

8. A method for the surveillance of objects in an image as set forth in claim 7, wherein the edge region reference is a centroid of an area of an edge region representing a potential object.

9. A method for the surveillance of objects in an image as set forth in claim 8, wherein the objects are cars, and wherein the geometric shape is substantially "U"-shaped.

10. A method for the surveillance of objects in an image as set forth in claim 9, wherein the search lines are extended in eight directions with one search line residing on a horizontal axis, with a 45 degree angle between each search line and each other search line, and wherein at least four intersections between search lines and the geometric shape, including an intersection in a bottom vertical direction, must occur for the edge region to be classified a compact object.

11. A method for the surveillance of objects in an image as set forth in claim 10, wherein the method further comprises a step of eliminating all edge regions representing objects not classified as compact objects.

12. A method for the surveillance of objects in an image as set forth in claim 11, wherein the objects are automobiles, and wherein the method further comprises a step of providing information regarding the compact objects to an automotive safety system.

13. A method for the surveillance of objects in an image as set forth in claim 5, further comprising steps of:
applying an attached line edge filter to the modified image to remove remaining oriented lines from edge regions in the modified image;
applying an aspect ratio and size filter to remove edge regions from the image that do not fit a pre-determined aspect ratio or size criterion;
fitting each of the remaining edge regions within a minimum enclosing rectangle; and
removing rectangles that are fully enclosed in a larger rectangle;
removing rectangles that are vertically stacked above another rectangle;
merging rectangles that overlap in excess of a pre-determined threshold; and
labeling each remaining rectangle as an object of interest.

14. A method for surveillance of objects in an image as set forth in claim 13, wherein the step of applying an attached line edge filter uses a Hough Transform to eliminate oriented edge segments that match patterns for expected undesired edge segments.

15. A method for surveillance of objects in an image as set forth in claim 13, wherein the aspect ratio has a threshold of 3.5 and the size criterion has a threshold of about $\frac{1}{30}$ of the pixels in the image, and where edge regions that do not match both of these criterion are excluded from the image.

16. A method for the surveillance objects in an image as set forth in claim 13, further comprising a step, between the step of applying an aspect ratio and size filter and the step of fining each of the remaining edge regions within a minimum enclosing rectangle, of applying a compactness filter to detect edge regions representing objects likely to be of interest based on a pre-determined geometrical constraint, and removing those edge regions from the image that do not match the pre-determined geometrical constraint.

17. A method for the surveillance of objects in an image as set forth in claim 16, wherein the step of applying the compactness filter comprises sub-steps of:
receiving an image including edge regions representing potential objects;
determining a geometric shape to apply as a compactness filter, with the geometric shape including a reference point;
determining an edge region reference on each edge region in the image, and aligning the reference point on each edge region with the reference point of the geometric shape;
extending search lines from the edge region reference in at least one direction; and
determining intersections of the search lines with the geometric shape, and if a predetermined number of intersections exists, classifying the edge region as a compact object.

18. A method for the surveillance of objects in an image as set forth in claim 17, wherein the edge region reference is a centroid of an area of an edge region representing a potential object.

19. A method for the surveillance of objects in an image as set forth in claim 18, wherein the objects are cars, and wherein the geometric shape is substantially "U"-shaped.

20. A method for the surveillance of objects in an image as set forth in claim 19, wherein the search lines are extended in eight directions with one search line residing on a horizontal axis, with a 45 degree angle between each search line and each other search line, and wherein at least four intersections between search lines and the geometric shape, including an intersection in a bottom vertical direction, must occur for the edge region to be classified a compact object.

21. A method for the surveillance of objects in an image as set forth in claim 20, wherein the method further comprises a step of eliminating all edge regions representing objects not classified as compact objects.

22. A method for the surveillance of objects in an image as set forth in claim 21, wherein the objects are automobiles, and wherein the method further comprises a step of providing information regarding the compact objects to an automotive safety system.

23. A method for the surveillance of objects in an image as set forth in claim 22, wherein the step of applying the ranking filter comprises sub-steps of:
receiving an image including edge regions;
determining a ranking reference in the image with respect to which to rank the edge regions;
determining an edge region reference on each edge region;
determining an offset of the edge region reference with respect to the ranking reference;
normalizing the offset for each edge region to determine a set of normalized offsets;
ranking the set of normalized offsets, whereby the ranked normalized offsets provide a ranking of the immediacy of objects represented by the edge regions.

24. A method for the surveillance of objects in an image as set forth in claim 23, wherein the edge region reference is a centroid of the area of the edge region to which it corresponds.

25. A method for the surveillance of objects in an image as set forth in claim 24, wherein the image comprises a plurality of pixels, wherein the edge regions each comprise areas represented by a number of pixels, and where each offset is represented by a distance measured as a number of pixels, and where each normalized offset is determined by dividing the number of pixels representing the offset for an edge region by the number of pixels representing the area of the edge region.

26. A method for the surveillance of objects in an image as set forth in claim 25, wherein the objects represented by edge regions are automobiles and the ranking reference is the hood of an automobile from which the image was taken.

27. A method for the surveillance of objects in an image as set forth in claim 26, wherein the offset includes only a vertical component measured as a normal line from a point on the hood of the automobile to the centroid of the area of the edge region.

28. A method for the surveillance of objects in an image as set forth in claim 26, wherein the immediacy is indicative of a risk of collision between the automobile from which the image was taken and the object represented by the edge region.

29. A method for the surveillance of objects in an image as set forth in claim 27, further comprising a step of selecting a fixed-size set of edge regions based on their ranking and discarding all other edge regions, whereby only the edge regions representing objects having the greatest immediacy are kept.

30. A method for the surveillance of objects in an image as set forth in claim 29, further comprising a step of providing the rankings of the edge regions representing objects kept to an automotive safety system.

31. A method for the surveillance of objects in an image as set forth in claim 1, wherein the step of applying the ranking filter comprises sub-steps of:
receiving an image including edge regions;
determining a ranking reference in the image with respect to which to rank the edge regions;
determining an edge region reference on each edge region;
determining an offset of the edge region reference with respect to the ranking reference;
normalizing the offset for each edge region to determine a set of normalized offsets;
ranking the set of normalized offsets, whereby the ranked normalized offsets provide a ranking of the immediacy of objects represented by the edge regions.

32. A method for the surveillance of objects in an image comprising a step of detecting objects in the image, with the step of detecting objects comprising sub-steps of:
receiving an image including edge regions;
independently extracting horizontal edges and vertical edges from the image;
removing horizontal edges and vertical edges that exceed a particular threshold;
combining the remaining horizontal edges and vertical edges into edge regions to generate an integrated edge map; and
applying a compactness filter to the edge regions detect objects likely to be of interest.

33. A method for the surveillance of objects in an image as set forth in claim 32, wherein in the step of independently extracting horizontal and vertical edges, the extracting is performed by use of a Sobel operator.

34. A method for the surveillance of objects in an image as set forth in claim 32, further comprising steps of:
after combining the remaining horizontal edges and vertical edges to generate an integrated edge map and prior to applying the compactness filter:
applying an attached line edge filter to the image to remove remaining oriented lines from edge regions in the image;
applying an aspect ratio and size filter to remove edge regions from the image that do not fit a pre-determined aspect ratio or size criterion;
fitting each of the remaining edge regions within a minimum enclosing rectangle; and
removing rectangles that are fully enclosed in a larger rectangle;
removing rectangles that are vertically stacked above another rectangle;
merging rectangles that overlap in excess of a pre-determined threshold; and
labeling each remaining rectangle as an object of interest.

35. A method for the surveillance of objects in an image as set forth in claim 34, wherein the step of applying the compactness filter comprises sub-steps of:
receiving an image including edge regions representing potential objects;
determining a geometric shape to apply as a compactness filter, with the geometric shape including a reference point;
determining an edge region reference on each edge region in the image, and aligning the reference point on each edge region with the reference point of the geometric shape;
extending search lines from the edge region reference in at least one direction; and
determining intersections of the search lines with the geometric shape, and if a predetermined number of intersections exists, classifying the edge region as a compact object.

36. A method for the surveillance of objects in an image as set forth in claim 35, wherein the edge region reference is a centroid of an area of an edge region representing a potential object.

37. A method for the surveillance of objects in an image as set forth in claim 36, wherein the objects are cars, and wherein the geometric shape is substantially "U"-shaped.

38. A method for the surveillance of objects in an image as set forth in claim 37, wherein the search lines are extended in eight directions with one search line residing on a horizontal axis, with a 45 degree angle between each search line and each other search line, and wherein at least four intersections between search lines and the geometric shape, including an intersection in a bottom vertical direction, must occur for the edge region to be classified a compact object.

39. A method for the surveillance of objects in an image as set forth in claim 38, wherein the method further comprises a step of eliminating all edge regions representing objects not classified as compact objects.

40. A method for the surveillance of objects in an image as set forth in claim 39, wherein the objects are automobiles, and wherein the method further comprises a step of providing information regarding the compact objects to an automotive safety system.

41. An apparatus for the surveillance of objects in an image, the apparatus comprising a computer system including a processor, a memory coupled with the processor, an input coupled with the processor for receiving images from an image source, and an output coupled with the processor for outputting information regarding objects in the image, wherein the computer system further comprises means, residing in its processor and memory, for detecting objects including means for:

receiving an image including edge regions;

independently extracting horizontal edges and vertical edges from the image;

eliminating horizontal edges and vertical edges that exceed at least one length-based threshold;

combining the remaining horizontal edges and vertical edges into edge regions to generate an integrated edge map; and applying a ranking filter to rank relative immediacies of objects represented by the edge regions in the integrated edge map.

42. An apparatus for the surveillance of objects in an image as set forth in claim 41, wherein the means for independently extracting horizontal and vertical edges is a Sobel operator.

43. An apparatus for the surveillance of objects in an image as set forth in claim 42, wherein after the means for independently extracting horizontal and vertical edges is operated, the horizontal and vertical edges are grouped into connected edge regions based on proximity.

44. An apparatus for the surveillance of objects in an image as set forth in claim 41, wherein after the means for independently extracting horizontal and vertical edges is operated, the horizontal and vertical edges are grouped into connected edge regions based on proximity.

45. An apparatus for the surveillance of objects in an image as set forth in claim 44, further comprising means for selecting a fixed-size set of objects based on their ranking and discarding all other objects, whereby a modified image is generated.

46. An apparatus for the surveillance of objects in an image as set forth in claim 45, further comprising means for applying a compactness filter to the modified image to detect edge regions representing objects likely to be of interest.

47. An apparatus for the surveillance of objects in an image as set forth in claim 46, wherein the means for applying the compactness filter comprises means for:

receiving an image including edge regions representing potential objects;

determining a geometric shape to apply as a compactness filter, with the geometric shape including a reference point;

determining an edge region reference on each edge region in the image, and aligning the reference point on each edge region with the reference point of the geometric shape;

extending search lines from the edge region reference in at least one direction; and determining intersections of the search lines with the geometric shape, and if a predetermined number of intersections exists, classifying the edge region as a compact object.

48. An apparatus for the surveillance of objects in an image as set forth in claim 47, wherein the edge region reference is a centroid of an area of an edge region representing a potential object.

49. An apparatus for the surveillance of objects in an image as set forth in claim 48, wherein the objects are cars, and wherein the geometric shape is substantially "U"-shaped.

50. An apparatus for the surveillance of objects in an image as set forth in claim 49, wherein the search lines are extended in eight directions with one search line residing on a horizontal axis, with a 45 degree angle between each search line and each other search line, and wherein at least four intersections between search lines and the geometric shape, including an intersection in a bottom vertical direction, must occur for the edge region to be classified a compact object.

51. An apparatus for the surveillance of objects in an image as set forth in claim 50, wherein the apparatus further comprises means for eliminating all edge regions representing objects not classified as compact objects.

52. An apparatus for the surveillance of objects in an image as set forth in claim 51, wherein the objects are automobiles, and wherein the apparatus further comprises means for providing information regarding the compact objects to an automotive safety system.

53. An apparatus for the surveillance of objects in an image as set forth in claim 45, further comprising means for:

applying an attached line edge filter to the modified image to remove remaining oriented lines from edge regions in the modified image;

applying an aspect ratio and size filter to remove edge regions from the image that do not fit a pre-determined aspect ratio or size criterion;

fitting each of the remaining edge regions within a minimum enclosing rectangle; and removing rectangles that are fully enclosed in a larger rectangle;

removing rectangles that are vertically stacked above another rectangle;

merging rectangles that overlap in excess of a pre-determined threshold; and labeling each remaining rectangle as an object of interest.

54. An apparatus for surveillance of objects in an image as set forth in claim 53, wherein the means for applying an attached line edge filter uses a Hough Transform to eliminate oriented edge segments that match patterns for expected undesired edge segments.

55. An apparatus for surveillance of objects in an image as set forth in claim 53, wherein the aspect ratio has a threshold of 3.5 and the size criterion has a threshold of about 1/30 of the pixels in the image, and where edge regions that do not match both of these criterion are excluded from the image.

56. An apparatus for the surveillance objects in an image as set forth in claim 53, further comprising means, operating temporally between the means for applying an aspect ratio and size filter and the means for fitting each of the remaining edge regions within a minimum enclosing rectangle, of applying a compactness filter to detect edge regions representing objects likely to be of interest based on a pre-determined geometrical constraint, and removing those edge regions from the image that do not match the pre-determined geometrical constraint.

57. An apparatus for the surveillance of objects in an image as set forth in claim 56, wherein the means for applying the compactness filter comprises means for:
- receiving an image including edge regions representing potential objects;
- determining a geometric shape to apply as a compactness filter, with the geometric shape including a reference point;
- determining an edge region reference on each edge region in the image, and aligning the reference point on each edge region with the reference point of the geometric shape;
- extending search lines from the edge region reference in at least one direction; and
- determining intersections of the search lines with the geometric shape, and if a predetermined number of intersections exists, classifying the edge region as a compact object.

58. An apparatus for the surveillance of objects in an image as set forth in claim 57, wherein the edge region reference is a centroid of an area of an edge region representing a potential object.

59. An apparatus for the surveillance of objects in an image as set forth in claim 58, wherein the objects are cars, and wherein the geometric shape is substantially "U"-shaped.

60. An apparatus for the surveillance of objects in an image as set forth in claim 59, wherein the search lines are extended in eight directions with one search line residing on a horizontal axis, with a 45 degree angle between each search line and each other search line, and wherein at least four intersections between search lines and the geometric shape, including an intersection in a bottom vertical direction, must occur for the edge region to be classified a compact object.

61. An apparatus for the surveillance of objects in an image as set forth in claim 60, wherein the apparatus further comprises means for eliminating all edge regions representing objects not classified as compact objects.

62. An apparatus for the surveillance of objects in an image as set forth in claim 61, wherein the objects are automobiles, and wherein the apparatus further comprises means for providing information regarding the compact objects to an automotive safety system.

63. An apparatus for the surveillance of objects in an image as set forth in claim 62, wherein the means for applying the ranking filter comprises means for:
- receiving an image including edge regions;
- determining a ranking reference in the image with respect to which to rank the edge regions;
- determining an edge region reference on each edge region;
- determining an offset of the edge region reference with respect to the ranking reference;
- normalizing the offset for each edge region to determine a set of normalized offsets;
- ranking the set of normalized offsets, whereby the ranked normalized offsets provide a ranking of the immediacy of objects represented by the edge regions.

64. An apparatus for the surveillance of objects in an image as set forth in claim 63, wherein the edge region reference is a centroid of the area of the edge region to which it corresponds.

65. An apparatus for the surveillance of objects in an image as set forth in claim 64, wherein the image comprises a plurality of pixels, wherein the edge regions each comprise areas represented by a number of pixels, and where each offset is represented by a distance measured as a number of pixels, and where each normalized offset is determined by dividing the number of pixels representing the offset for an edge region by the number of pixels representing the area of the edge region.

66. An apparatus for the surveillance of objects in an image as set forth in claim 65, wherein the objects represented by edge regions are automobiles and the ranking reference is the hood of an automobile from which the image was taken.

67. An apparatus for the surveillance of objects in an image as set forth in claim 66, wherein the offset includes only a vertical component measured as a normal line from a point on the hood of the automobile to the centroid of the area of the edge region.

68. An apparatus for the surveillance of objects in an image as set forth in claim 66, wherein the immediacy is indicative of a risk of collision between the automobile from which the image was taken and the object represented by the edge region.

69. An apparatus for the surveillance of objects in an image as set forth in claim 67, further comprising means for selecting a fixed-size set of edge regions based on their ranking and discarding all other edge regions, whereby only the edge regions representing objects having the greatest immediacy are kept.

70. An apparatus for the surveillance of objects in an image as set forth in claim 69, further comprising means for providing the rankings of the edge regions representing objects kept to an automotive safety system.

71. An apparatus for the surveillance of objects in an image as set forth in claim 41, wherein the means for applying the ranking filter comprises means for:
- receiving an image including edge regions;
- determining a ranking reference in the image with respect to which to rank the edge regions;
- determining an edge region reference on each edge region;
- determining an offset of the edge region reference with respect to the ranking reference;
- normalizing the offset for each edge region to determine a set of normalized offsets;
- ranking the set of normalized offsets, whereby the ranked normalized offsets provide a ranking of the immediacy of objects represented by the edge regions.

72. An apparatus for the surveillance of objects in an image, the apparatus comprising a computer system including a processor, a memory coupled with the processor, an input coupled with the processor for receiving images from an image source, and an output coupled with the processor for outputting information regarding objects in the image, wherein the computer system further comprises means, residing in its processor and memory, for detecting objects in the image, including means for:
- receiving an image including edge regions;
- independently extracting horizontal edges and vertical edges from the image;
- removing horizontal edges and vertical edges that exceed a particular threshold;
- combining the remaining horizontal edges and vertical edges into edge regions to generate an integrated edge map; and
- applying a compactness filter to the edge regions detect objects likely to be of interest.

73. An apparatus for the surveillance of objects in an image as set forth in claim 72, wherein in the means for independently extracting horizontal and vertical edges is a Sobel operator.

74. An apparatus for the surveillance of objects in an image as set forth in claim 72, further comprising means for:

generating an integrated edge map after combining the remaining and prior to applying the compactness filter:
  applying an attached line edge filter to the image to remove remaining oriented lines from edge regions in the image;
  applying an aspect ratio and size filter to remove edge regions from the image that do not fit a pre-determined aspect ratio or size criterion;
  fitting each of the remaining edge regions within a minimum enclosing rectangle; and
    removing rectangles that are fully enclosed in a larger rectangle;
    removing rectangles that are vertically stacked above another rectangle;
    merging rectangles that overlap in excess of a pre-determined threshold; and
    labeling each remaining rectangle as an object of interest.

75. An apparatus for the surveillance of objects in an image as set forth in claim 74, wherein the means for applying the compactness filter includes means for:
  receiving an image including edge regions representing potential objects;
  determining a geometric shape to apply as a compactness filter, with the geometric shape including a reference point;
  determining an edge region reference on each edge region in the image, and aligning the reference point on each edge region with the reference point of the geometric shape;
  extending search lines from the edge region reference in at least one direction; and
  determining intersections of the search lines with the geometric shape, and if a predetermined number of intersections exists, classifying the edge region as a compact object.

76. An apparatus for the surveillance of objects in an image as set forth in claim 75, wherein the edge region reference is a centroid of an area of an edge region representing a potential object.

77. An apparatus for the surveillance of objects in an image as set forth in claim 76, wherein the objects are cars, and wherein the geometric shape is substantially "U"-shaped.

78. An apparatus for the surveillance of objects in an image as set forth in claim 77, wherein the search lines are extended in eight directions with one search line residing on a horizontal axis, with a 45 degree angle between each search line and each other search line, and wherein at least four intersections between search lines and the geometric shape, including an intersection in a bottom vertical direction, must occur for the edge region to be classified a compact object.

79. An apparatus for the surveillance of objects in an image as set forth in claim 78, wherein the apparatus further comprises means for eliminating all edge regions representing objects not classified as compact objects.

80. An apparatus for the surveillance of objects in an image as set forth in claim 79, wherein the objects are automobiles, and wherein the apparatus further comprises means for providing information regarding the compact objects to an automotive safety system.

81. A computer program product for the surveillance of objects in an image, the computer program product comprising a computer-readable medium further comprising computer-readable means for detecting objects including means for:
  receiving an image including edge regions;
  independently extracting horizontal edges and vertical edges from the image;
  eliminating horizontal edges and vertical edges that exceed at least one length-based threshold;
  combining the remaining horizontal edges and vertical edges into edge regions to generate an integrated edge map; and
  applying a ranking filter to rank relative immediacies of objects represented by the edge regions in the integrated edge map.

82. A computer program product for the surveillance of objects in an image as set forth in claim 81, wherein the means for independently extracting horizontal and vertical edges is a Sobel operator.

83. A computer program product for the surveillance of objects in an image as set forth in claim 82, wherein the means for independently extracting horizontal and vertical edges is configured such that after it is operated, the horizontal and vertical edges are grouped into connected edge regions based on proximity.

84. A computer program product for the surveillance of objects in an image as set forth in claim 81, wherein the means for independently extracting horizontal and vertical edges is configured such that after it is operated, the horizontal and vertical edges are grouped into connected edge regions based on proximity.

85. A computer program product for the surveillance of objects in an image as set forth in claim 84, further comprising means for selecting a fixed-size set of objects based on their ranking and discarding all other objects, whereby a modified image is generated.

86. A computer program product for the surveillance of objects in an image as set forth in claim 85, further comprising means for applying a compactness filter to the modified image to detect edge regions representing objects likely to be of interest.

87. A computer program product for the surveillance of objects in an image as set forth in claim 86, wherein the means for applying the compactness filter comprises means for:
  receiving an image including edge regions representing potential objects;
  determining a geometric shape to apply as a compactness filter, with the geometric shape including a reference point;
  determining an edge region reference on each edge region in the image, and aligning the reference point on each edge region with the reference point of the geometric shape;
  extending search lines from the edge region reference in at least one direction; and
  determining intersections of the search lines with the geometric shape, and if a predetermined number of intersections exists, classifying the edge region as a compact object.

88. A computer program product for the surveillance of objects in an image as set forth in claim 87, wherein the edge region reference is a centroid of an area of an edge region representing a potential object.

89. A computer program product for the surveillance of objects in an image as set forth in claim 88, wherein the objects are cars, and wherein the geometric shape is substantially "U"-shaped.

90. A computer program product for the surveillance of objects in an image as set forth in claim 89, wherein the search lines are extended in eight directions with one search line residing on a horizontal axis, with a 45 degree angle between each search line and each other search line, and wherein at least four intersections between search lines and the geometric shape, including an intersection in a bottom vertical direction, must occur for the edge region to be classified a compact object.

91. A computer program product for the surveillance of objects in an image as set forth in claim 90, wherein the computer program product further comprises means for eliminating all edge regions representing objects not classified as compact objects.

92. A computer program product for the surveillance of objects in an image as set forth in claim 91, wherein the objects are automobiles, and wherein the computer program product further comprises means for providing information regarding the compact objects to an automotive safety system.

93. A computer program product for the surveillance of objects in an image as set forth in claim 85, further comprising means for:
applying an attached line edge filter to the modified image to remove remaining oriented lines from edge regions in the modified image;
applying an aspect ratio and size filter to remove edge regions from the image that do not fit a pre-determined aspect ratio or size criterion;
fitting each of the remaining edge regions within a minimum enclosing rectangle; and
removing rectangles that are fully enclosed in a larger rectangle;
removing rectangles that are vertically stacked above another rectangle;
merging rectangles that overlap in excess of a pre-determined threshold; and
labeling each remaining rectangle as an object of interest.

94. A computer program product for surveillance of objects in an image as set forth in claim 93, wherein the means for applying an attached line edge filter uses a Hough Transform to eliminate oriented edge segments that match patterns for expected undesired edge segments.

95. A computer program product for surveillance of objects in an image as set forth in claim 93, wherein the aspect ratio has a threshold of 3.5 and the size criterion has a threshold of about 1/30 of the pixels in the image, and where edge regions that do not match both of these criterion are excluded from the image.

96. A computer program product for the surveillance objects in an image as set forth in claim 93, further comprising means, to operate temporally between the means for applying an aspect ratio and size filter and the means for fitting each of the remaining edge regions within a minimum enclosing rectangle, of applying a compactness filter to detect edge regions representing objects likely to be of interest based on a pre-determined geometrical constraint, and removing those edge regions from the image that do not match the pre-determined geometrical constraint.

97. A computer program product for the surveillance of objects in an image as set forth in claim 96, wherein the means for applying the compactness filter comprises means for:
receiving an image including edge regions representing potential objects;
determining a geometric shape to apply as a compactness filter, with the geometric shape including a reference point;
determining an edge region reference on each edge region in the image, and aligning the reference point on each edge region with the reference point of the geometric shape;
extending search lines from the edge region reference in at least one direction; and
determining intersections of the search lines with the geometric shape, and
if a predetermined number of intersections exists, classifying the edge region as a compact object.

98. A computer program product for the surveillance of objects in an image as set forth in claim 97, wherein the edge region reference is a centroid of an area of an edge region representing a potential object.

99. A computer program product for the surveillance of objects in an image as set forth in claim 98, wherein the objects are cars, and wherein the geometric shape is substantially "U"-shaped.

100. A computer program product for the surveillance of objects in an image as set forth in claim 99, wherein the search lines are extended in eight directions with one search line residing on a horizontal axis, with a 45 degree angle between each search line and each other search line, and wherein at least four intersections between search lines and the geometric shape, including an intersection in a bottom vertical direction, must occur for the edge region to be classified a compact object.

101. A computer program product for the surveillance of objects in an image as set forth in claim 100, wherein the computer program product further comprises means for eliminating all edge regions representing objects not classified as compact objects.

102. A computer program product for the surveillance of objects in an image as set forth in claim 101, wherein the objects are automobiles, and wherein the computer program product further comprises means for providing information regarding the compact objects to an automotive safety system.

103. A computer program product for the surveillance of objects in an image as set forth in claim 102, wherein the means for applying the ranking filter comprises means for:
receiving an image including edge regions;
determining a ranking reference in the image with respect to which to rank the edge regions;
determining an edge region reference on each edge region;
determining an offset of the edge region reference with respect to the ranking reference;
normalizing the offset for each edge region to determine a set of normalized offsets;
ranking the set of normalized offsets, whereby the ranked normalized offsets provide a ranking of the immediacy of objects represented by the edge regions.

104. A computer program product for the surveillance of objects in an image as set forth in claim 103, wherein the object reference is a centroid of the area of the object.

105. A computer program product for the surveillance of objects in an image as set forth in claim 104, wherein the image comprises a plurality of pixels, wherein the edge regions each comprise areas represented by a number of pixels, and where each offset is represented by a distance measured as a number of pixels, and where each normalized offset is determined by dividing the number of pixels representing the offset for an edge region by the number of pixels representing the area of the edge region.

106. A computer program product for the surveillance of objects in an image as set forth in claim 105, wherein the objects represented by edge regions are automobiles and the ranking reference is the hood of an automobile from which the image was taken.

107. A computer program product for the surveillance of objects in an image as set forth in claim 106, wherein the offset includes only a vertical component measured as a normal line from a point on the hood of the automobile to the centroid of the area of the edge region.

108. A computer program product for the surveillance of objects in an image as set forth in claim 106, wherein the immediacy is indicative of a risk of collision between the automobile from which the image was taken and the object represented by the edge region.

109. A computer program product for the surveillance of objects in an image as set forth in claim 107, further comprising means for selecting a fixed-size set of edge regions based on their ranking and discarding all other edge regions, whereby only the edge regions representing objects having the greatest immediacy are kept.

110. A computer program product for the surveillance of objects in an image as set forth in claim 109, further comprising means for providing the rankings of the edge regions representing objects kept to an automotive safety system.

111. A computer program product for the surveillance of objects in an image as set forth in claim 81, wherein the means for applying the ranking filter comprises means for:
receiving an image including edge regions;
determining a ranking reference in the image with respect to which to rank the edge regions;
determining an edge region reference on each edge region;
determining an offset of the edge region reference with respect to the ranking reference;
normalizing the offset for each edge region to determine a set of normalized offsets;
ranking the set of normalized offsets, whereby the ranked normalized offsets provide a ranking of the immediacy of objects represented by the edge regions.

112. A computer program product for the surveillance of objects in an image, the computer program product comprising a computer-readable medium further comprising computer-readable means for detecting objects including means for:
receiving an image including edge regions;
independently extracting horizontal edges and vertical edges from the image;
removing horizontal edges and vertical edges that exceed a particular threshold;
combining the remaining horizontal edges and vertical edges into edge regions to generate an integrated edge map; and
applying a compactness filter to the edge regions detect objects likely to be of interest.

113. A computer program product for the surveillance of objects in an image as set forth in claim 112, wherein in the means for independently extracting horizontal and vertical edges is a Sobel operator.

114. A computer program product for the surveillance of objects in an image as set forth in claim 112, further comprising means for:
generating an integrated edge map after combining the remaining and prior to applying the compactness filter:
applying an attached line edge filter to the image to remove remaining oriented lines from edge regions in the image;
applying an aspect ratio and size filter to remove edge regions from the image that do not fit a pre-determined aspect ratio or size criterion;
fitting each of the remaining edge regions within a minimum enclosing rectangle; and
removing rectangles that are fully enclosed in a larger rectangle;
removing rectangles that are vertically stacked above another rectangle;
merging rectangles that overlap in excess of a pre-determined threshold; and
labeling each remaining rectangle as an object of interest.

115. A computer program product for the surveillance of objects in an image as set forth in claim 114, wherein the means for applying the compactness filter includes means for:
receiving an image including edge regions representing potential objects;
determining a geometric shape to apply as a compactness filter, with the geometric shape including a reference point;
determining an edge region reference on each edge region in the image, and aligning the reference point on each edge region with the reference point of the geometric shape;
extending search lines from the edge region reference in at least one direction; and
determining intersections of the search lines with the geometric shape, and if a predetermined number of intersections exists, classifying the edge region as a compact object.

116. A computer program product for the surveillance of objects in an image as set forth in claim 115, wherein the edge region reference is a centroid of an area of an edge region representing a potential object.

117. A computer program product for the surveillance of objects in an image as set forth in claim 116, wherein the objects are cars, and wherein the geometric shape is substantially "U"-shaped.

118. A computer program product for the surveillance of objects in an image as set forth in claim 117, wherein the search lines are extended in eight directions with one search line residing on a horizontal axis, with a 45 degree angle between each search line and each other search line, and wherein at least four intersections between search lines and the geometric shape, including an intersection in a bottom vertical direction, must occur for the edge region to be classified a compact object.

119. A computer program product for the surveillance of objects in an image as set forth in claim 118, wherein the computer program product further comprises means for eliminating all edge regions representing objects not classified as compact objects.

120. A computer program product for the surveillance of objects in an image as set forth in claim 119, wherein the objects are automobiles, and wherein the computer program product further comprises means for providing information regarding the compact objects to an automotive safety system.

* * * * *